(12) United States Patent
Hashioka et al.

(10) Patent No.: US 10,834,288 B2
(45) Date of Patent: Nov. 10, 2020

(54) GENERATING IMAGE REGION DOT DATA BASED ON CORRECTED NUMBER OF DOTS AND DETERMINED ARRANGEMENT PRIORITY

(71) Applicant: CANON KABUSHIKI KAISHA, Tokyo (JP)

(72) Inventors: Yoshiki Hashioka, Kawasaki (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/708,643

(22) Filed: Dec. 10, 2019

(65) Prior Publication Data

US 2020/0204705 A1    Jun. 25, 2020

(30) Foreign Application Priority Data

Dec. 21, 2018 (JP) ................................. 2018-239885
Dec. 21, 2018 (JP) ................................. 2018-239935

(51) Int. Cl.
| | | |
|---|---|---|
| H04N 1/405 | (2006.01) | |
| G06K 15/02 | (2006.01) | |
| H04N 1/40 | (2006.01) | |
| H04N 1/409 | (2006.01) | |

(52) U.S. Cl.
CPC ....... *H04N 1/4051* (2013.01); *G06K 15/1822* (2013.01); *G06K 15/1877* (2013.01); *G06K 15/1881* (2013.01); *H04N 1/40062* (2013.01); *H04N 1/4092* (2013.01)

(58) Field of Classification Search
None
See application file for complete search history.

(56) References Cited

U.S. PATENT DOCUMENTS

| | | |
|---|---|---|
| 9,201,839 B2 | 12/2015 | Hara et al. |
| 9,462,091 B2 | 10/2016 | Hara et al. |
| 9,485,388 B2 | 11/2016 | Kodama et al. |
| 9,734,439 B2 | 8/2017 | Hara et al. |
| 9,749,496 B2 | 8/2017 | Fujimoto et al. |
| 10,027,848 B2 | 7/2018 | Fuse et al. |
| 10,043,118 B2 | 8/2018 | Sumi et al. |

(Continued)

FOREIGN PATENT DOCUMENTS

JP        2016021735 A        2/2016

*Primary Examiner* — Scott A Rogers
(74) *Attorney, Agent, or Firm* — Carter, DeLuca & Farrell LLP

(57) ABSTRACT

In an embodiment of the present disclosure, an image processing apparatus for generating dot data, which defines whether or not a dot is arranged in each pixel, includes: a dot number derivation unit configured to derive a number of dots to be arranged in a predetermined region of image data; a determination unit configured to determine an arrangement priority of a pixel in which a dot is arranged, based on the pixel value of each pixel included in the predetermined region and a threshold value group in a threshold value matrix; a correction unit configured to correct the derived number of dots, in a case where the derived number of dots is smaller than a criterial number of dots; and a generation unit configured to generate the dot data, based on the corrected number of dots and the arrangement priority.

22 Claims, 19 Drawing Sheets

(56) References Cited

U.S. PATENT DOCUMENTS

| | | | |
|---|---|---|---|
| 10,057,459 B2 | 8/2018 | Yamamoto et al. | |
| 10,063,743 B2 | 8/2018 | Fuse et al. | |
| 10,073,370 B2 | 9/2018 | Takikawa et al. | |
| 10,187,553 B2 | 1/2019 | Takesue et al. | |
| 10,194,053 B2 | 1/2019 | Otani et al. | |
| 10,356,282 B2 | 7/2019 | Ochiai et al. | |
| 10,650,294 B2 * | 5/2020 | Kodama | H04N 1/405 |
| 2017/0139363 A1 | 5/2017 | Takikawa et al. | |
| 2017/0310851 A1 * | 10/2017 | Dobashi | H04N 1/6008 |
| 2019/0007580 A1 * | 1/2019 | Moribe | H04N 1/605 |
| 2019/0156164 A1 | 5/2019 | Yanai et al. | |
| 2019/0362202 A1 | 11/2019 | Kikuta et al. | |
| 2020/0074251 A1 | 3/2020 | Takesue et al. | |
| 2020/0079102 A1 | 3/2020 | Ochiai et al. | |
| 2020/0156386 A1 | 5/2020 | Otani et al. | |
| 2020/0171820 A1 | 6/2020 | Takesue et al. | |
| 2020/0184289 A1 | 6/2020 | Takesue et al. | |

* cited by examiner

| 60 | 0 | 0 | 0 | 0 | 0 | 0 | 0 |
|---|---|---|---|---|---|---|---|
| 0 | 60 | 0 | 0 | 0 | 0 | 0 | 0 |
| 0 | 0 | 60 | 0 | 0 | 0 | 0 | 0 |
| 0 | 0 | 60 | 0 | 0 | 0 | 0 | 0 |
| 0 | 0 | 0 | 60 | 0 | 0 | 0 | 0 |
| 0 | 0 | 0 | 0 | 60 | 0 | 0 | 0 |
| 0 | 0 | 0 | 0 | 0 | 60 | 0 | 0 |
| 0 | 0 | 0 | 0 | 0 | 60 | 0 | 0 |

602

| 203 | 231 | 243 | 83 | 7 | 47 | 55 | 39 |
|---|---|---|---|---|---|---|---|
| 91 | 119 | 99 | 195 | 151 | 191 | 167 | 123 |
| 159 | 43 | 135 | 111 | 235 | 79 | 115 | 147 |
| 15 | 187 | 23 | 255 | 183 | 223 | 227 | 3 |
| 63 | 219 | 215 | 139 | 107 | 247 | 211 | 143 |
| 175 | 75 | 71 | 27 | 251 | 103 | 67 | 31 |
| 131 | 87 | 59 | 11 | 207 | 35 | 127 | 51 |
| 19 | 199 | 171 | 155 | 95 | 179 | 239 | 136 |

603

| 21 |  |  |  |  |  |  |  |
|---|---|---|---|---|---|---|---|
|  | -107 |  |  |  |  |  |  |
|  |  | -19 |  |  |  |  |  |
|  |  | -175 |  |  |  |  |  |
|  |  |  | -195 |  |  |  |  |
|  |  |  |  | -155 |  |  |  |
|  |  |  |  | -115 | -15 |  |  |
|  |  |  |  |  |  |  |  |

604

|   |   |   |   |   |   |   |   |
|---|---|---|---|---|---|---|---|
| 1 |   |   |   |   |   |   |   |
|   |   | 3 |   |   |   |   |   |
|   |   |   | 2 |   |   |   |   |
|   |   |   | 4 |   |   |   |   |
|   |   |   |   | 1 |   |   |   |
|   |   |   |   |   | 3 |   |   |
|   |   |   |   |   | 2 | 1 |   |

605

| 1 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 1 | 0 | 0 |
| 0 | 0 | 0 | 0 | 0 | 0 | 0 | 0 |

801

| 0 | 0 | 0 | 0 | 0 | 60 | 0 | 0 |
|---|---|---|---|---|---|---|---|
| 0 | 0 | 0 | 0 | 0 | 60 | 0 | 0 |
| 0 | 0 | 0 | 0 | 60 | 60 | 0 | 0 |
| 0 | 0 | 0 | 60 | 0 | 0 | 0 | 0 |
| 0 | 0 | 0 | 60 | 0 | 0 | 0 | 0 |
| 0 | 0 | 60 | 0 | 0 | 0 | 0 | 0 |
| 0 | 60 | 0 | 0 | 0 | 0 | 0 | 0 |
| 60 | 0 | 0 | 0 | 0 | 0 | 0 | 0 |

802

| 136 | 239 | 179 | 95 | 155 | 59 | 199 | 15 |
|---|---|---|---|---|---|---|---|
| 51 | 127 | 35 | 207 | 11 | 171 | 87 | 131 |
| 31 | 67 | 103 | 251 | 27 | 175 | 215 | 71 |
| 143 | 211 | 247 | 107 | 139 | 75 | 219 | 63 |
| 3 | 227 | 223 | 79 | 255 | 23 | 187 | 19 |
| 147 | 115 | 183 | 39 | 111 | 135 | 43 | 159 |
| 123 | 167 | 191 | 151 | 195 | 99 | 119 | 91 |
| 235 | 55 | 47 | 7 | 83 | 243 | 231 | 203 |

| 31 | 231 | 243 | 83 |
|----|-----|-----|-----|
| 91 | 119 | 7 | 195 |
| 159 | 39 | 135 | 111 |
| 15 | 187 | 23 | 255 |

1501

| 8 | 0 | 0 | 0 |
|---|---|---|---|
| 0 | 8 | 0 | 0 |
| 0 | 0 | 8 | 0 |
| 0 | 0 | 0 | 8 |

1502

| 16 | 0 | 0 | 0 |
|----|---|---|---|
| 0 | 16 | 0 | 0 |
| 0 | 0 | 16 | 0 |
| 0 | 0 | 0 | 16 |

1503

| 1 |   |   |   |
|---|---|---|---|
|   | 2 |   |   |
|   |   | 3 |   |
|   |   |   | 4 |

1504

| K |   |   |   |
|---|---|---|---|
|   | C |   |   |
|   |   | C |   |
|   |   |   | M |

1505

GENERATING IMAGE REGION DOT DATA BASED ON CORRECTED NUMBER OF DOTS AND DETERMINED ARRANGEMENT PRIORITY

BACKGROUND OF THE INVENTION

Field of the Invention

The present disclosure relates to a technology for converting image data into higher-quality half-tone image data.

Description of the Related Art

There is wide use of an image forming apparatus such as a printer that prints digital image data (hereinafter simply referred to as image data) of an image that is captured by a camera or an image that is created by a method such as CG. In image data, each pixel is generally represented in multi-tone such as 8 bits or 16 bits per color. On the other hand, since such an image forming apparatus represents a tone by "on" and "off" of dots by a printing material, the number of tone levels that can be output is few. For this reason, a quantization method for converting multi-tone image data into the number of tone levels that can be output by an image forming apparatus is used. In general, there is halftoning as a quantization method for reducing the number of tone levels. Half-tone image data obtained after halftoning indicates a dot pattern to be output on a printing medium by an image forming apparatus, so as to artificially represent a tone of an image. A dither process is often used as a type of halftoning. In a dither process, by use of a threshold value matrix in which threshold values are arranged so as to respectively correspond to pixels of image data, a pixel value of the image data and a threshold value of the threshold value matrix are compared on a per pixel basis, so as to determine "on" or "off" of a dot per pixel.

However, in a case where image data including a high-frequency component is input and processed, there has been a possibility that the high-frequency component included in the image data interferes with a cycle of threshold values of a threshold value matrix, which may cause occurrence of moire (texture), sharpness deterioration, break of a fine line, etc. Thus, Japanese Patent Laid-Open No. 2016-21735 discloses halftoning in which image data is divided into multiple process regions and, for each of the process regions, the number of dots to be arranged in the region is determined according to the pixel values, and the priority for arranging the dots in the respective pixels of the region is determined.

However, in such a conventional technology, there has been a possibility that the visibility of a bright fine line is reduced because of such halftoning. A bright fine line is a line with high brightness (small pixel value) and narrow line width. Therefore, in a process region including a bright fine line only, the average pixel value is low. Thus, in such a method where the number of dots is determined based on pixel values, there has been a possibility that a bright fine line disappears in an output image since the number of dots to be arranged in a process region is reduced.

Therefore, the purpose of the present disclosure is to provide an image processing apparatus, an image processing method, and a storage medium with which, in a case where quantization processing is performed on image data, disappearance of bright fine lines is inhibited and high-quality half-tone image data can be generated.

SUMMARY OF THE INVENTION

An image processing apparatus according to an embodiment of the present disclosure is an image processing apparatus for generating dot data, which is to be used for forming an image on a printing medium and defines whether or not a dot is arranged in each pixel, and includes: a dot number derivation unit configured to derive a number of dots to be arranged in a predetermined region of image data that is input, based on a pixel value of each pixel included in the predetermined region, the number of dots being derived on a per predetermined region basis; a determination unit configured to determine an arrangement priority, which indicates a priority of a pixel in which a dot is arranged in the predetermined region, by use of an evaluation value based on the pixel value of each pixel included in the predetermined region and a threshold value group in a threshold value matrix, the threshold value group corresponding to the predetermined region; a correction unit configured to correct the number of dots derived by the dot number derivation unit, based on a pixel value of at least one pixel in the predetermined region, in a case where the number of dots derived by the dot number derivation unit is smaller than a criterial number of dots; and a generation unit configured to generate the dot data corresponding to the predetermined region, based on the number of dots corrected by the correction unit and the arrangement priority determined by the determination unit.

Further features of the present invention will become apparent from the following description of exemplary embodiments with reference to the attached drawings.

BRIEF DESCRIPTION OF THE DRAWINGS

FIG. 6 is a diagram for explaining a processing result obtained by the processes shown in FIG. 5;

FIG. 8 is a diagram for explaining dispersity of dots;

FIG. 15 is a diagram for explaining an arrangement priority determination process in the fourth embodiment;

DESCRIPTION OF THE EMBODIMENTS

Hereinafter, explanations are given of embodiments of the present disclosure with reference to the drawings. It should be noted that the following embodiments do not limit the present disclosure and that all of the combinations of the characteristics explained in the present embodiments are not necessarily essential for the present disclosure. Note that the same reference sign is assigned for explanation of the identical component.

First Embodiment (Configuration of Image Processing Apparatus)

Figure 1:
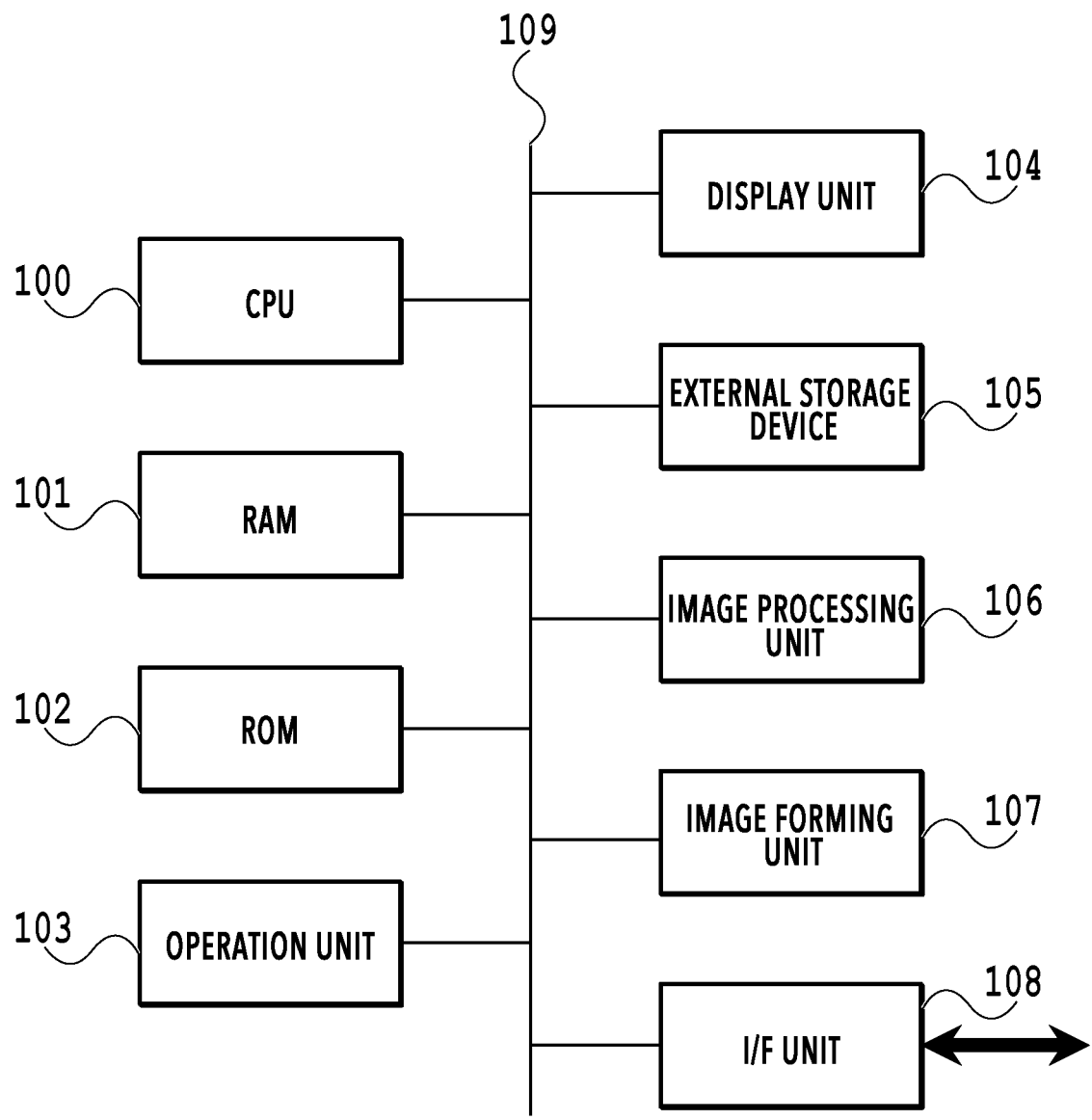
FIG. 1 is a block diagram showing a configuration of an image forming system including an image processing unit according to the first embodiment.

FIG. 1 is a block diagram showing a configuration of an image forming system including an image processing unit (hereinafter also referred to as an image processing apparatus) according to the first embodiment. In the present embodiment, as an example of the image processing apparatus, an explanation is given of a built-in image processing controller in a printer that forms an image by use of a printing material on a printing medium. The image forming system according to the first embodiment includes a CPU 100, a RAM 101, a ROM 102, an operation unit 103, a display unit 104, an external storage device 105, an image processing unit 106, an image forming unit 107, an I/F (interface) unit 108, and a bus 109.

The CPU 100 controls operation of the entire image forming system by use of input data, a computer program stored in the below-described RAM or ROM, etc. Note that, although a case in which the CPU 100 controls the entire image forming system is taken as an example for explanation here, it is also possible that the entire image forming system is controlled by multiple hardware, each of which is assigned with a process.

The RAM 101 includes a storage area for temporarily storing a computer program, data, or the like, which is read out from the external storage device 105, or data received from the outside via the I/F unit 108. Furthermore, the RAM 101 is used as a storage area used in a case where the CPU 100 executes various kings of processes, or a storage area used in a case where the image processing unit 106 executes image processing. That is, the RAM 101 can provide various types of storage areas as required. The ROM 102 stores setting parameters for setting each unit in the image forming system, a boot program, and the like.

The operation unit 103 is configured with a keyboard, a mouse, and the like, and accepts an instruction from an operator through an operation by the operator. Thereby, the operator can input various instructions to the CPU 100.

The display unit 104 is configured with a CRT, a liquid crystal screen, or the like, and can display a processing result of the CPU 100 as an image or a character. Note that, in a case where the display unit 104 is a touch-sensitive panel that can detect a touch operation, it is possible that the display unit 104 functions as a part of the operation unit 103.

The external storage device 105 is a large capacity information storage device, which is represented by a hard disk drive. The external storage device 105 stores a computer program, data, or the like, for an OS (operating system) or the CPU 100 to execute a process. Furthermore, the external storage device 105 stores temporary data (image data to be input or output, a threshold value matrix used by the image processing unit 106, or the like) generated as a result of a process performed by each unit. A computer program, data, or the like, stored in the external storage device 105 are read out as required according to control by the CPU 100, stored in the RAM 101, and dealt with as a process subject by the CPU 100.

The image processing unit 106 is realized as a processor that can execute a computer program or a dedicated image processing circuit. The image processing unit 106 executes various kinds of image processing for converting image data that is input as a printing subject into image data that can be output by the image forming unit 107. For example, upon receiving an instruction to execute image processing from the CPU 100, a process for converting N-tone input image data stored in the external storage device 105 into M-tone output image data is executed.

The image forming unit 107 forms an image by use of a printing material on a printing medium such as paper, based on output image data which is output from the image processing unit 106. An inkjet scheme in which an image is formed by ejecting ink onto a printing medium from a nozzle is adopted to the image forming unit 107 in the present embodiment. Note that an electrophotographic method in which an image is formed by exposing a charged image bearing member, developing the image with toner, and transferring the toner image onto a printing medium may be adopted to the image forming unit 107 as well.

The I/F unit 108 functions as an interface for connecting the image forming system and an external device in the present embodiment. Furthermore, the I/F unit 108 also functions as an interface for exchanging data with a communication device by use of infrared communication, a wireless LAN, or the like. All of the above-described components are connected to the bus 109 and exchange data with each other via the bus 109.

(Configuration of Image Processing Unit 106)

Figure 2:
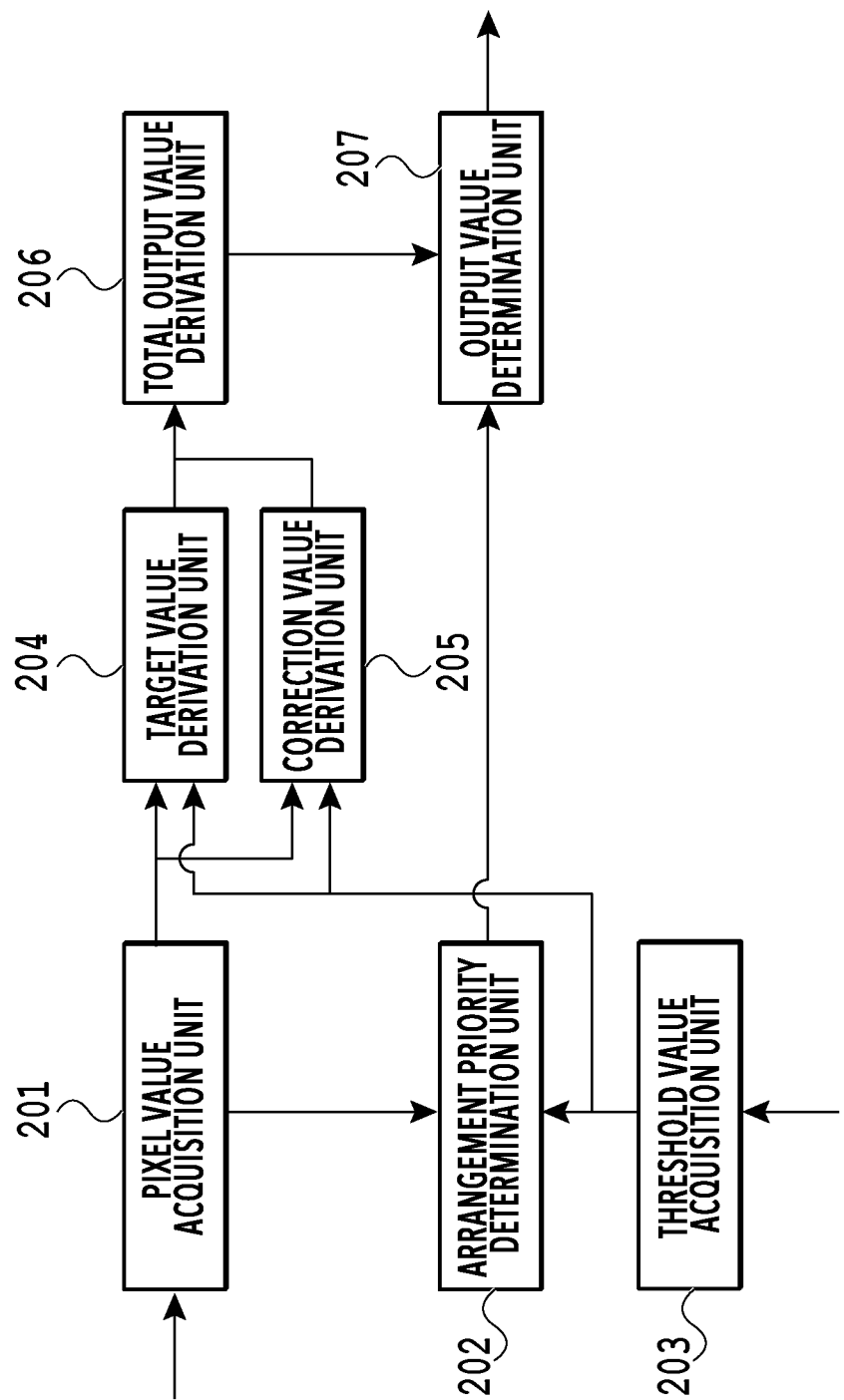
FIG. 2 is a block diagram showing a configuration of the image processing unit in the first embodiment.

An explanation is given of the image processing unit 106 according to the present embodiment. The image processing unit 106 executes halftoning for converting input image data into half-tone image data having a smaller number of tone levels than the input image data. FIG. 2 is a block diagram showing a configuration of the image processing unit 106 according to the first embodiment. The image processing unit 106 in the present embodiment is realized as a dedicated image processing circuit having the configuration shown in FIG. 2. The image processing unit 106 includes a pixel value acquisition unit 201, an arrangement priority determination unit 202, a threshold value acquisition unit 203, a target value derivation unit 204, a correction value derivation unit 205, a total output value derivation unit 206, and an output value determination unit 207.

The image processing unit 106 in the present embodiment inputs 8-bit image data, which indicates a value from 0 to 255 for each pixel, as input image data. Then, the image processing unit 106 converts the input image data of 8 bits per pixel into 1-bit binary half-tone image data (output image data) having a value of either 0 or 1 for each pixel. In half-tone image data, a pixel having a pixel value (output value) of 0 represents "off" of a dot, and a pixel having a pixel value of 1 represents "on" of a dot. Such half-tone image data artificially reproduces input image data with the smaller number of tone levels than the number of tone levels represented by the input image data. Note that, hereinafter, half-tone image data may be referred to as dot data.

Figure 3:
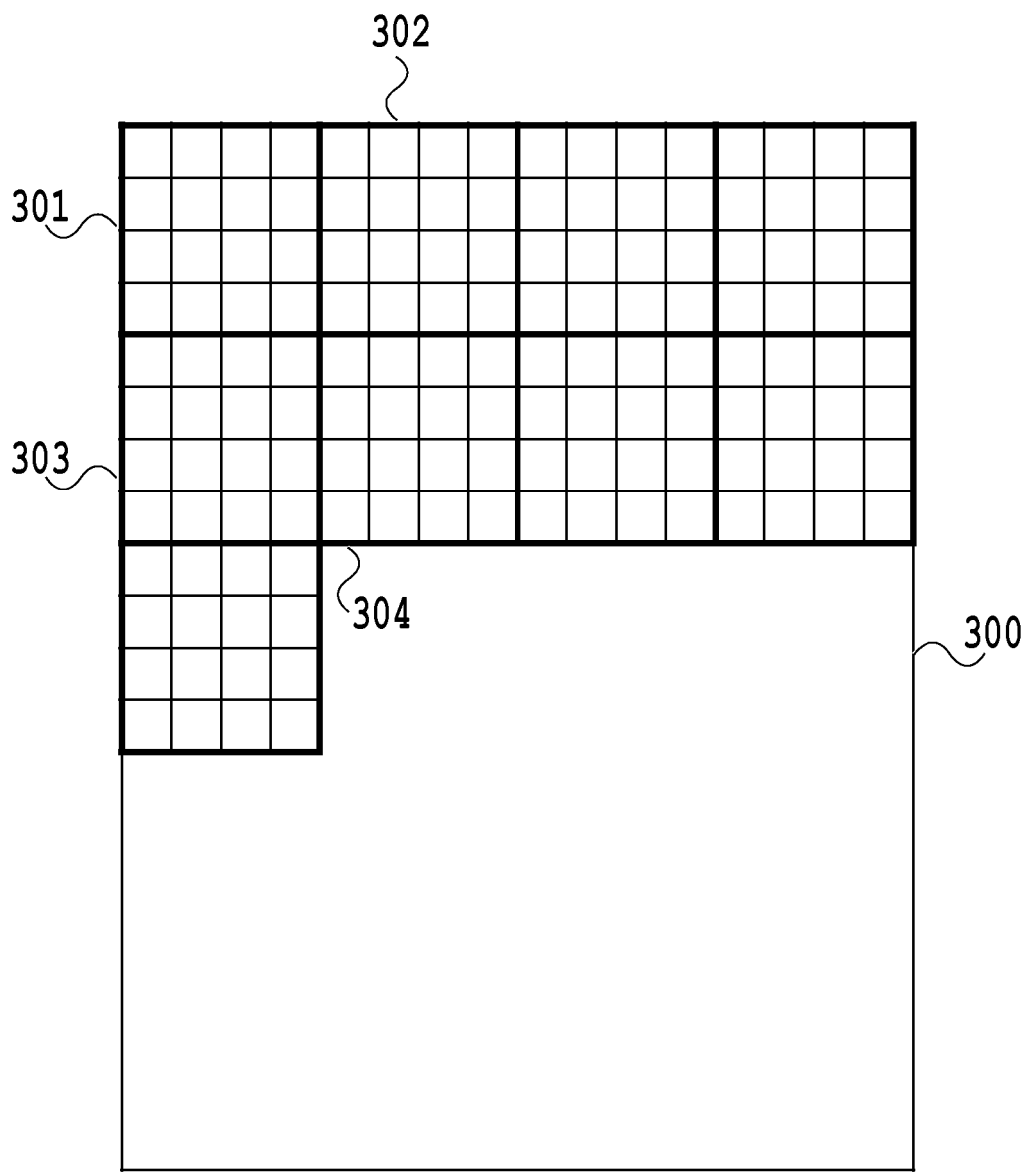
FIG. 3 is a diagram showing process regions of input image data.

The pixel value acquisition unit 201 acquires pixel values of multiple pixels included in a unit region (hereinafter referred to as a process region or a predetermined region), which is to be a process subject in input image data. FIG. 3 is a diagram showing process regions in input image data 300. In the present embodiment, a region of four by four pixels indicated by a thick frame in FIG. 3 is a process region. For example, in a case where the process region is the region 301, the pixel value acquisition unit 201 acquires each of the pixel values of the 16 pixels included in the region 301.

Figure 4:
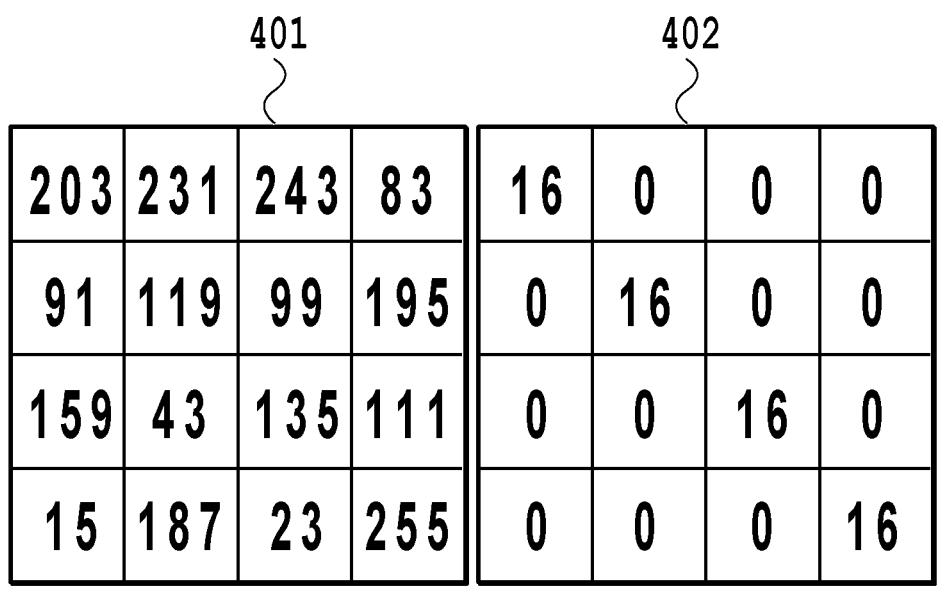
FIG. 4 is a diagram showing an example of a process region including a bright fine line and a threshold value group corresponding to the process region in the first embodiment.

The threshold value acquisition unit 203 acquires a threshold value group used for a dither process from the RAM 101 or the external storage device 105. FIG. 4 is a diagram showing an example of a process region including a bright fine line and a threshold value group corresponding to the process region in the present embodiment. In the present embodiment, it is assumed that the threshold value group 401 shown in FIG. 4 is used for a dither process. The threshold value group 401 is a part of a threshold value matrix stored in the RAM 101 or the external storage device 105. The threshold value acquisition unit 203 acquires such a threshold value group as the threshold value group 401 shown in FIG. 4 from the threshold value matrix stored in the RAM 101, or the like, each time a pixel value of a process region is read by the pixel value acquisition unit 201.

The target value derivation unit 204 derives a target value, which is for determining the total number of output values (total output value) in a process region, based on pixel values of multiple pixels included in the process region and threshold values. As described above, since an output value is represented by 1 or 0 for "on" or "off" of a dot, a target value for a process region corresponds to the number of dots to be "on" in the process region. In the present embodiment, the average value of the pixel values of the respective pixels in a process region is compared with each threshold value of a threshold value group, and the number of threshold values that are smaller than the average value is derived as a target value.

The correction value derivation unit 205 derives a correction amount (correction value), which is for correcting a total output value of a process region, based on the pixel value of each pixel in the process region and each threshold value of a threshold value group. In the present embodiment, the correction value derivation unit 205 compares the maximum pixel value in a process region with the minimum threshold value of a threshold value group. Then, in a case where the maximum pixel value is larger than the minimum threshold value, the correction value derivation unit 205 sets 1 as the correction value, and, otherwise, the correction value derivation unit 205 sets 0 as the correction value.

The total output value derivation unit 206 derives the total number of output values (total output value) for a process region, based on a target value derived by the target value derivation unit 204 and a correction value derived by the correction value derivation unit 205. In the present embodiment, the total output value derivation unit 206 compares a target value and a correction value and derives the larger value as a total output value.

The arrangement priority determination unit 202 determines arrangement priority that indicates on which pixel a dot is preferentially arranged in a process region, based on the pixel value of each pixel in the process region and each threshold value of a threshold value group. In the present embodiment, the arrangement priority determination unit 202 derives a difference value between a pixel value and a threshold value that are positionally corresponding to each other (here, a difference value obtained by subtracting the threshold value from the pixel value) as an evaluation value for determining the arrangement priority for a dot. Then, the arrangement priority determination unit 202 determines the arrangement priority for a dot by sorting the derived evaluation value of each pixel. In a case where an input image includes a bright fine line, there is a small number of effective pixels (not-white pixels), which configure the line, and white pixels having a pixel value of 0 occupy the majority, as indicated in the process region 402. In addition, since each of the pixels configuring a bright fine line has a small difference in pixel value from a white pixel, the threshold values of a threshold value group have a large impact on arrangement priority for dots in such a region as indicated by the process region 402, and, thus, there is a possibility that the arrangement priorities for white pixels become high. In a case where a dot is arranged on a white pixel, the sharpness of a generated image is deteriorated. Therefore, it is preferred that effective pixels other than while pixels are in higher priorities in arrangement priority for dots. Note that, although pixels having a pixel value of 0 are treated as white pixels in the present embodiment, pixels having a pixel value equal to or smaller than a predetermined value may be treated as white pixels, as in a publicly known background process performed on an image read by a document scanner. In that case, effective pixels are pixels having a pixel value larger than the predetermined value.

The output value determination unit 207 assigns 1 as an output value to each pixel until reaching a total output value, which is derived by the total output value derivation unit 206, based on arrangement priority for dots, which is determined by the arrangement priority determination unit 202. Pixels to which 1 is not assigned as an output value are treated as pixels to which 0 is assigned as an output value. Thereby, an output value of each pixel in a process region is determined.

Here, an explanation is given of the specific processing contents of the target value derivation unit 204, the correction value derivation unit 205, and the total output value derivation unit 206 with reference to FIG. 4. The target value derivation unit 204 calculates the average value of the pixel values of the process region 402 obtained by the pixel value acquisition unit 201, so as to derive a target value, based on the average value. The average value of the pixel values of the process region 402 is (16*4+0*12)/16=4. Therefore, comparing the average value with each of the threshold values in the threshold value group 401, all of the threshold values are equal to or larger than the average value. Thus, the target value derivation unit 204 derives 0 as the target value. Next, the correction value derivation unit 205 compares 16, which is the maximum pixel value of the process region 402, with 15, which is the minimum threshold value of the threshold value group 401. Since the maximum pixel value exceeds the minimum threshold value in the case of the process region 402 (region 301), the correction value derivation unit 205 sets 1 as the correction value. Finally, the total output value derivation unit 206 compares the target value and the correction value, so as to derive the larger value (here, the correction value (1)) as the total output value. Here, the value range of a target value is determined based on the number of pixels in a process region. Therefore, the value range of the target value for the process region 402 is 0 to 16. On the other hand, the value range of a correction value, which is derived by the correction value derivation unit 205, is either 0 or 1. Therefore, in many cases, a target value is directly adopted as a total output value, and a correction value is used for correcting the total output value in a case where the target value is 0.

In a case where a target value of a process region is determined based on a low-frequency component such as an average value of pixel values, it is difficult that high-frequency information such as a bright fine line is reflected on the target value. On the other hand, in a normal dither process in which a threshold value in a threshold value matrix and a pixel value are directly compared, high-frequency information can be reflected in a case of an image including a thick fine line. However, in a case of an image including a bright fine line, there may be a case in which the fine line cannot be reproduced due to interference between the positions of effective pixels and the threshold value pattern of the threshold value matrix. In the present embodiment, in a case where the maximum pixel value of a process region is larger than the minimum threshold value, the total output value is not 0. In other words, in a case where at least one of the pixel values in a process region exceeds a threshold value in a threshold value group corresponding to the process region, the total output value is not 0. This means that, in a case where a process region satisfies a predetermined condition, the lower limit value of the number of dots in the process region is one or more. Therefore, it is possible to inhibit bright fine lines from disappearing.

(Operation of Image Processing Unit 106)

Figure 5:
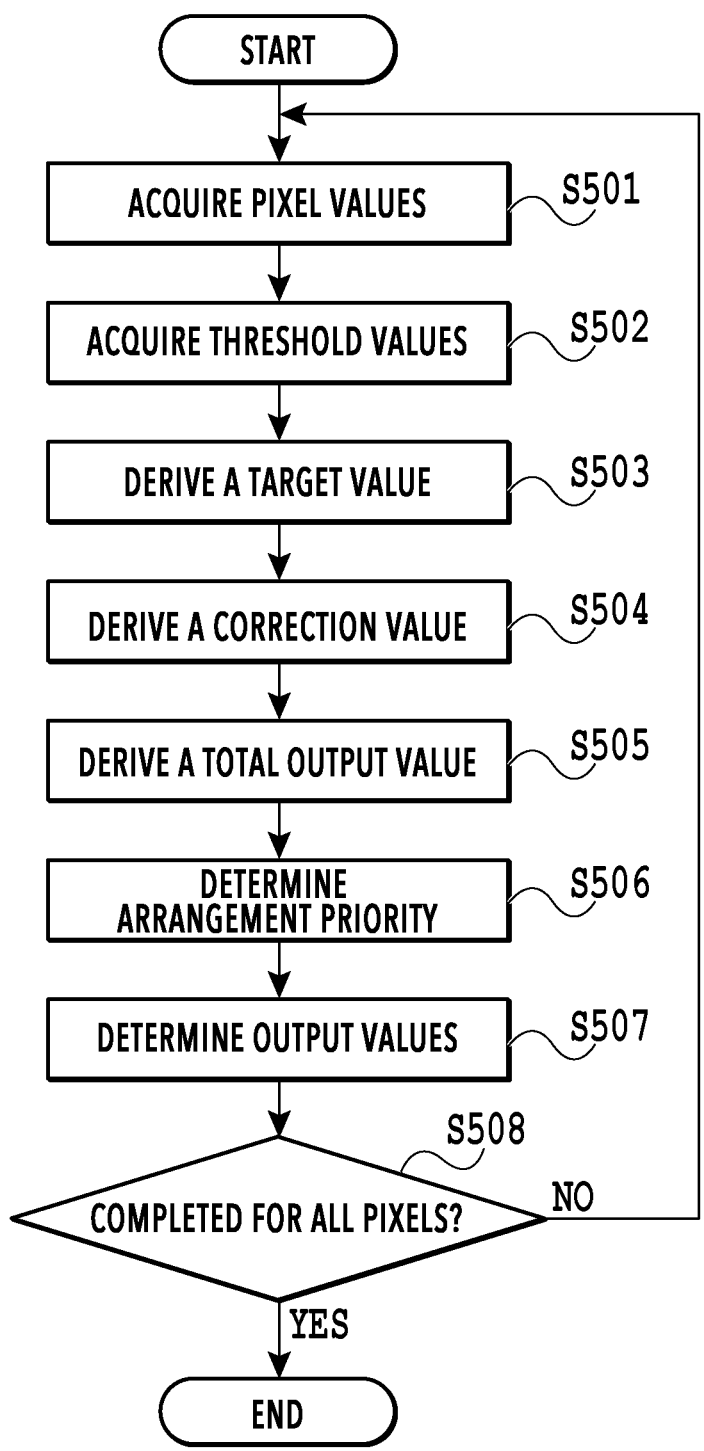
FIG. 5 is a flowchart showing processes performed by the image processing unit in the first embodiment.

FIG. 5 is a flowchart showing processes performed by the image processing unit 106 in the first embodiment. Note that the series of processes in the flowchart shown in FIG. 5 is performed by the CPU 100 retrieving a program code stored in the ROM 102 into the RAM 101 and executing the program code. Alternatively, a part or all of the functions in the steps of FIG. 5 may be implemented by hardware such as an ASIC or an electronic circuit. Note that the symbol "S" in the explanation of each process means that it is a step in the flowchart. FIG. 6 is a diagram for explaining the processing result obtained by the processes shown in FIG. 5.

First, the pixel value acquisition unit 201 acquires the pixel value of each pixel in a process region from image data (input image data), which is acquired from the RAM 101 or the external storage device 105 (S501). Here, for simplicity of explanation, it is assumed that the image data 601 of 16 by 16 pixels shown in FIG. 6 is acquired as the input image data. Note that the image data 601 corresponds to a part (regions 301 to 304) of the image data 300 shown in FIG. 3. Furthermore, it is assumed that the size of a process region is four by four pixels and the processes are executed on the image data 601 in the order of the upper left region, the upper right region, the lower left region, and the lower right region.

Next, the threshold value acquisition unit 203 acquires a threshold value group, which corresponds to a process region, from the RAM 101 or the external storage device 105 (S502). The threshold value matrix 602 shown in FIG. 6 is a threshold value matrix used for the input image data 601. Therefore, here, a threshold value group at a position corresponding to a process region is acquired from the threshold value matrix 602. Note that, since the processes of S501 and S502 do not depend on each other, either may be executed first and the processes may be executed in parallel.

Next, based on the pixel values acquired in S501 and the threshold values acquired in S502, the target value derivation unit 204 derives a target value of the process region (the target value of the total number of pixels in which dots are to be "on" in the process region) (S503). Here, the target value derivation unit 204 calculates the average value of all the pixels in the process region and compares the calculated average value and each of the threshold values in the threshold value group, so as to derive the target value, which is the number of threshold values that are smaller than the average value. In a case where the upper left region of the input image data 601 is the process region, the obtained average value of the pixels in the process region is 3.75. On the other hand, the minimum threshold value in the threshold value group corresponding to the process region in the threshold value matrix 602 is 15. Therefore, the target value of the process region, that is, the number of pixels in which dots are to be "on" in the process region is 0.

Next, the correction value derivation unit 205 derives a correction value (the correction amount for the target value) for the process region, based on the pixel values acquired in S501 and the threshold values acquired in S502 (S504). Here, the correction value derivation unit 205 compares the maximum pixel value in the process region (the maximum value of the pixel values of all the pixels) and the minimum threshold value (the minimum value of the threshold values in the threshold value group). Further, in a case where the maximum pixel value is larger than the minimum threshold value, 1 is set as the correction value, and, otherwise, 0 is set as the correction value. In the case of the input image data 601, the maximum pixel value is 60 whereas the minimum threshold value of the threshold value matrix 602 is 15. Therefore, 1 is set as the correction value.

Next, the total output value derivation unit 206 determines the number of pixels (total output value) in which dots are to be "on" in the process region, based on the target value derived in S503 and the correction value derived in S504 (S505). Here, the target value and the correction value are compared, and the larger value is adopted as the total output value. In the case of the input image data 601, the target value is 0 and the correction value is 1. Therefore, 1 is set as the total output value. Note that, in S504, the value of the correction value is either 0 or 1. Therefore, for simplification of calculation, it is possible that, in a case where the target value derived in S503 is larger than 0, the target value is directly adopted as the total output value, and, in a case where the target value is 0, the correction value is adopted as the total output value.

Next, for the pixels in which dots are to be "on" in the process region, the arrangement priority determination unit 202 determines the priority order in which dots of the pixels become "on" (S506). That is, the arrangement priority determination unit 202 determines arrangement priority that indicates on which pixel in the process region a dot is preferentially arranged. Here, first, the arrangement priority determination unit 202 derives the evaluation value of each pixel position by subtracting the threshold value of the corresponding pixel position from the pixel value of each pixel position in the process region. In the present embodiment, since 16 pixels are included in the process region, evaluation values for 16 pixels are derived in S506. The evaluation value group 603 shown in FIG. 6 indicates the evaluation values of respective pixel positions, which are derived based on the input image data 601 and the threshold value matrix 602. Note that, in the present embodiment, in order to prevent dots from being arranged in pixels whose pixel value is 0, the evaluation values of the pixels whose pixel value is 0 are set to the minimum value (=0−the maximum value that a threshold value can take). Note that, in the evaluation value group 603 shown in FIG. 6, illustration of the evaluation values for the pixels whose pixel value is 0 is omitted. Next, the arrangement priority determination unit 202 sorts the derived evaluation values in descending order and determines the sorted result as the arrangement priority. As a result, for the pixels on which dots are to be "on" in the process region, dots are arranged in order from the pixel with the largest evaluation value. The arrangement priority group 604 shown in FIG. 6 indicates the arrangement priority for dots in the input image data 601, which is determined based on the evaluation value group 603.

Next, according to the arrangement priority obtained in S506, the output value determination unit 207 sets 1 as the output values of pixels of the number indicated by the total output value obtained in S505 (S507). For the other pixels, 0 is set as the output values, so that the dots thereof are to be "off". The output result group 605 shown in FIG. 6 indicates the output values determined for respective pixels in the input image data 601.

Finally, the image processing unit 106 determines whether the processes have been completed for all of the process regions (S508). In a case of being completed (YES in S508), the image processing unit 106 ends the processes. In a case of not being completed (NO in S508), the image processing unit 106 returns to the process of S501 and repeats the processes of S501 to S507. Note that, since it is possible to execute the process of S506 as long as a threshold value group included in a process region is acquired in S502, the processes of S503 to S505 and the process of S506 do not depend on each other. Therefore, either the process of S506 or the processes of S503 to S505 may be executed first. Further, the processes may be executed in parallel.

In the present embodiment, the target value is a value from 0 to 16 whereas the correction value is 0 or 1. In a case where the target value is 1 or more, the target value is not corrected and is directly adopted. On the other hand, in a case where the target value of a process region is 0 and the maximum pixel value is larger than the minimum threshold value, the correction value (1), instead of the target value (0), is adopted as the total output value. This means that, in the case where the target value of a process region is 0 and the maximum pixel value is larger than the minimum threshold value, it is determined that the target value is corrected, so that correction for adding the number of dots indicated by the correction value is executed. Further, in a case where the target value of a process region is 0 and the maximum pixel value is smaller than the minimum threshold value, the target value (0) is adopted as the total output value. This means that, in the case where the target value of a process region is 0 and the maximum pixel value is smaller than the minimum threshold value, it is determined that the target value is not corrected.

As described above, in the present embodiment, in a case where the number of dots in a process region is 0, it is possible to inhibit a bright fine line from disappearing, by adding one dot according to the pixel values. In particular, in a case where the maximum pixel value is larger than the minimum threshold value in a process region, one dot is output if a pixel value in the process region and the corresponding threshold value group are in phase. Therefore, by performing correction of adding one dot only to a region in which a dot could have been output, it is possible to appropriately emphasize a bright fine line.

Note that, although, as described above, a target value and a correction value are compared and the larger value is output as a total output value in the present embodiment, the correction value is reflected to the total output value only in a case where the target value is 0 since the value range of the target value is 0 to 16 and the value range of the correction value is 0 or 1. Therefore, the correction value may be derived only in a case where the target value is 0. That is, the process of S504 by the correction value derivation unit 205 may be performed only in a case where the target value derived in S503 is 0. By performing the process of S504 only in a case where the target value is smaller than the criterial number of dots (here, 1) in the above way, the speed of the processes by the image processing unit 106 can be faster. Note that the criterial number of dots is not limited to 1 and may be changed according to the size of a process region.

Note that the essential point of the present embodiment is that correction processing is additionally performed at the time of determining a total output value. Therefore, the configuration of the image processing unit 106 is not limited to the configuration shown in FIG. 2. For example, there may be such a configuration in which a dot is added in a case where the total number of output values in a predetermined region is equal to or smaller than a predetermined value, that is, such a configuration in which correction processing is added to the subsequent stage of the total output value derivation unit 206. Furthermore, in the present embodiment, the maximum pixel value in a process region and the minimum threshold value are used for deriving the correction value. It is possible to apply another representative value to the embodiment. For example, instead of the maximum pixel value, the total value or median value of the pixel values of the pixels in a process region may be used. For example, by using the total value for deriving the correction value according to which a dot is added in a case where a bright fine line of which the maximum pixel value of the process region is equal to or smaller than the minimum threshold value is included, it is possible to inhibit disappearance of the bright fine line in a brighter region. The average value and median value of the pixel values of effective pixels in a process region may be used as well. Alternatively, a value obtained by multiplying the average value of pixel values in a process region by N according to the number of effective pixels may be used as well. For example, there may be a case in which: a value obtained by multiplying the average value by 1.3 is used in a case where the number of effective pixels is 3; a value obtained by multiplying the average value by 2 is used in a case where the number of effective pixels is 2; a value obtained by multiplying the average value by 4 is used in a case where the number of effective pixels is 1; and a value obtained by multiplying the average value by 1 is used in a case of another number of effective pixels. Alternatively, the total number of the pixel values in a process region may be used. Furthermore, although the minimum threshold value in a threshold value group is used for deriving the correction value in the present embodiment, the embodiment is not limited thereto. That is, the minimum threshold value among the threshold values corresponding to white pixels in the process region may be used. Moreover, although dots are not arranged in pixels whose pixel value is 0 in the present embodiment, dots may not be arranged in pixels whose pixel value is equal to or smaller than a predetermined value.

Second Embodiment

In the first embodiment, as a method for the correction value derivation unit 205 to derive a correction value, an explanation is given of the method in which the maximum pixel value in a process region is compared with the minimum threshold value of the threshold value group corresponding to the process region, so as to derive a correction value, based on the comparison result. As a method for deriving a correction value, it is possible to apply another method such as controlling a statistic value, such as the number of effective pixels in a process region, based on a condition. Therefore, in the present embodiment, an explanation is given of a method of controlling a dot occurrence probability by multiplying the maximum pixel value by a coefficient according to the number of effective pixels in a process region. Note that the same reference signs are attached to the configurations equivalent to the first embodiment so as to omit detailed explanations thereof.

Figure 7:
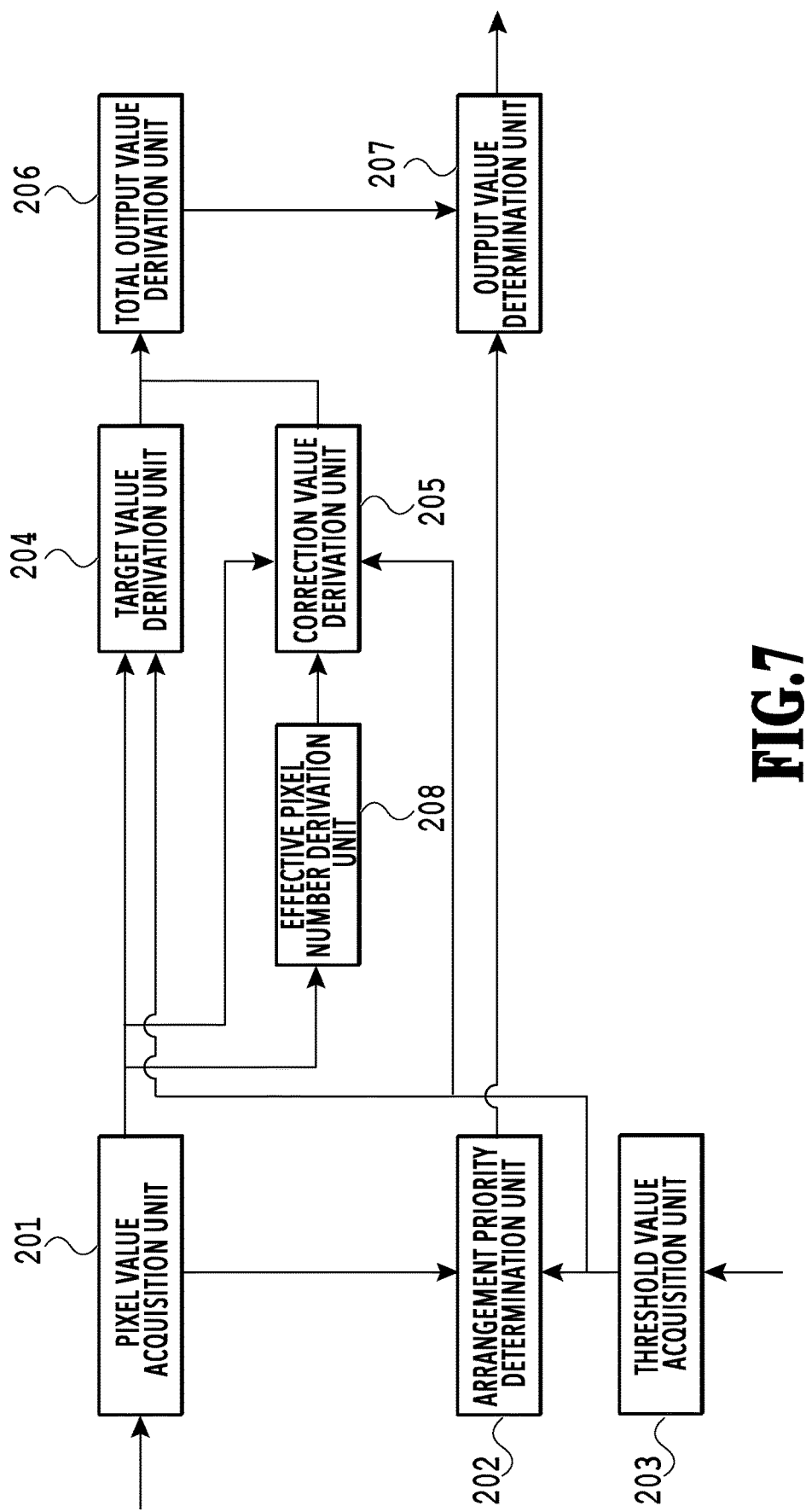
FIG. 7 is a block diagram showing a configuration of an image processing unit in the second embodiment.

FIG. 7 is a block diagram showing a configuration of the image processing unit 106 according to the second embodiment. The image processing unit 106 in the present embodiment includes an effective pixel number derivation unit 208 in addition to the configuration of the first embodiment. Further, the correction value derivation unit 205 executes a process different from that of the first embodiment.

The effective pixel number derivation unit 208 selects a pixel whose pixel value is not 0 as an effective pixel from the pixel values of a process region acquired by the pixel value acquisition unit 201, so as to derive the number of selected effective pixels (hereinafter referred to as the number of effective pixels). The effective pixel number derivation unit 208 outputs the derived number of effective pixels to the correction value derivation unit 205.

In response to input of the pixel values of a process region acquired by the pixel value acquisition unit 201, a threshold value group acquired by the threshold value acquisition unit 203, and the number of effective pixels derived by the effective pixel number derivation unit 208, the correction value derivation unit 205 executes different processes according to the number of effective pixels. In a case where the number of effective pixels is not 1, the correction value derivation unit 205 compares the maximum pixel value in the process region and the minimum threshold value of the threshold value group, as with the first embodiment. Further, in a case where the maximum pixel value is larger than the minimum threshold value, the correction value derivation unit 205 sets 1 as the correction value, and, otherwise, the correction value derivation unit 205 sets 0 as the correction value. On the other hand, in a case where the number of effective pixels is 1, the correction value derivation unit 205 compares the maximum pixel value multiplied by coefficient "a" with the minimum threshold value. Further, in a case where the maximum pixel value multiplied by the coefficient is larger than the minimum threshold value, the correction value derivation unit 205 sets 1 as the correction value, and, otherwise, the correction value derivation unit 205 sets 0 as the correction value. It is assumed that "a" is 0.5 in the present embodiment. As described above, in the present embodiment, a dot occurrence probability is controlled by multiplying the pixel value of an effective pixel by a coefficient to adjust the probability for setting of a correction value, so as to improve dispersity of dots.

Here, an explanation is given of dispersity of dots with reference to FIG. 8. Generally, there is a case in which a threshold value matrix having a blue noise characteristic is used for a dither process, so as to improve dispersity of dots. By using a threshold value matrix that takes a blue noise characteristic into account, it is possible to improve dispersity of dots in a range larger than a process region. Accordingly, it is possible to reduce the probability that dots are continuously arranged, not only inside a process region, but also at a boundary with an adjacent process region. However, since the subject for the arrangement priority determination unit 202 to set arrangement priority of a dot is a pixel position where an effective pixel is present, there is a possibility that the blue noise characteristic of a threshold value matrix is not taken into account in a case where a process region of which the number of effective pixels is 1 is present. A process region of which the number of effective pixels is 1 is, for example, such a process region in which a bright fine line grazes an edge of the region as indicated by the input image data 801 (here, the upper left process region). Note that, here, it is assumed the threshold value group 802 is acquired by the threshold value acquisition unit 203. In a case where the arrangement priority determination unit 202 determines arrangement priority for such a process region, a dot is arranged at a corner (the circled pixel in the figure) of the region as indicated by the output result group 803. Therefore, there is a high possibility that the dot and a dot in an adjacent process region are continuously arranged. Thus, in a case where a process region of which the number of effective pixels is 1 is present, there is a possibility that dispersity of dots is reduced and the blue noise characteristic cannot be obtained. Further, in such a case, there is a possibility that a part of a bright fine line becomes thick, which causes deterioration in perception of the bright fine line.

Therefore, in a case where the input number of effective pixels is 1, the correction value derivation unit 205 of the present embodiment compares the minimum threshold value with a value obtained by multiplying the maximum pixel value in the process region by "α" (=0.5), so as to determine the correction value. By comparing the minimum threshold value with a value obtained by multiplying the maximum pixel value by a coefficient in the above way, it is possible to lower the probability that 1 is set as the correction value for a process region of which the number of effective pixels is 1. That is, it is possible to lower the probability that a dot is arranged continuously with a dot of an adjacent process region, and, therefore, it is possible to improve dispersity of dots. The output result group 804 is an output result in a case where the correction value is determined by comparing the minimum threshold value with a value (=30) obtained by multiplying the maximum pixel value (=60) of the process region with "α" (=0.5). In the output result group 804, the output values in the upper left process region are all 0. That is, the continuity of dots occurring in the output result group 803 is eliminated. As described above, according to the present embodiment, even in a case where a process region of which the number of effective pixels is 1 is present, it is possible to improve dispersity of dots as indicated by the output result group 804.

Note that, although the second embodiment takes the configuration in which the maximum pixel value is multiplied by a coefficient in accordance with the number of effective pixels, it is also possible to use position information of effective pixels. As described above, the probability that dots are arranged continuously increases in a case where dots are arranged in the pixels positioned at the four corners of a process region. Therefore, it is also possible to perform the same processes as in the first embodiment after multiplying the pixel values of the pixels at the four corners by the above-described coefficient. With such a configuration, it is possible to inhibit continuity of dots and improve dispersity of dots as well.

Furthermore, in the present embodiment, an explanation is given of the example in which the maximum pixel value in a process region is multiplied by a coefficient in a case where the input number of effective pixels is 1. However, even in a case where the number of effective pixels is equal to or smaller than a predetermined number (for example, 2) that is not 1, it is possible to perform the process of multiplying the maximum pixel value in the process region by a coefficient if there is a possibility that the blue noise characteristic of a threshold value matrix is not taken into account.

Third Embodiment

In the conventional technologies, particularly in a case of printing a color image, a density value of each color tends to become small in a process of decomposing an RGB image into a CMYK image, and a lower density region tends to be generated in image data of each color of C, M, Y, and K. As a result, there has been a case in which a sufficient number of dots cannot be obtained to reproduce the color tone of a bright fine line in image data obtained as a result of halftoning.

Therefore, in the present embodiment, an explanation is given of an image processing apparatus, an image processing method, and a storage medium with which the color tone of a bright fine line can be more appropriately reproduced in a case of performing quantization processing on a color image.

(Configuration of Image Processing Unit 106)

Figure 9:
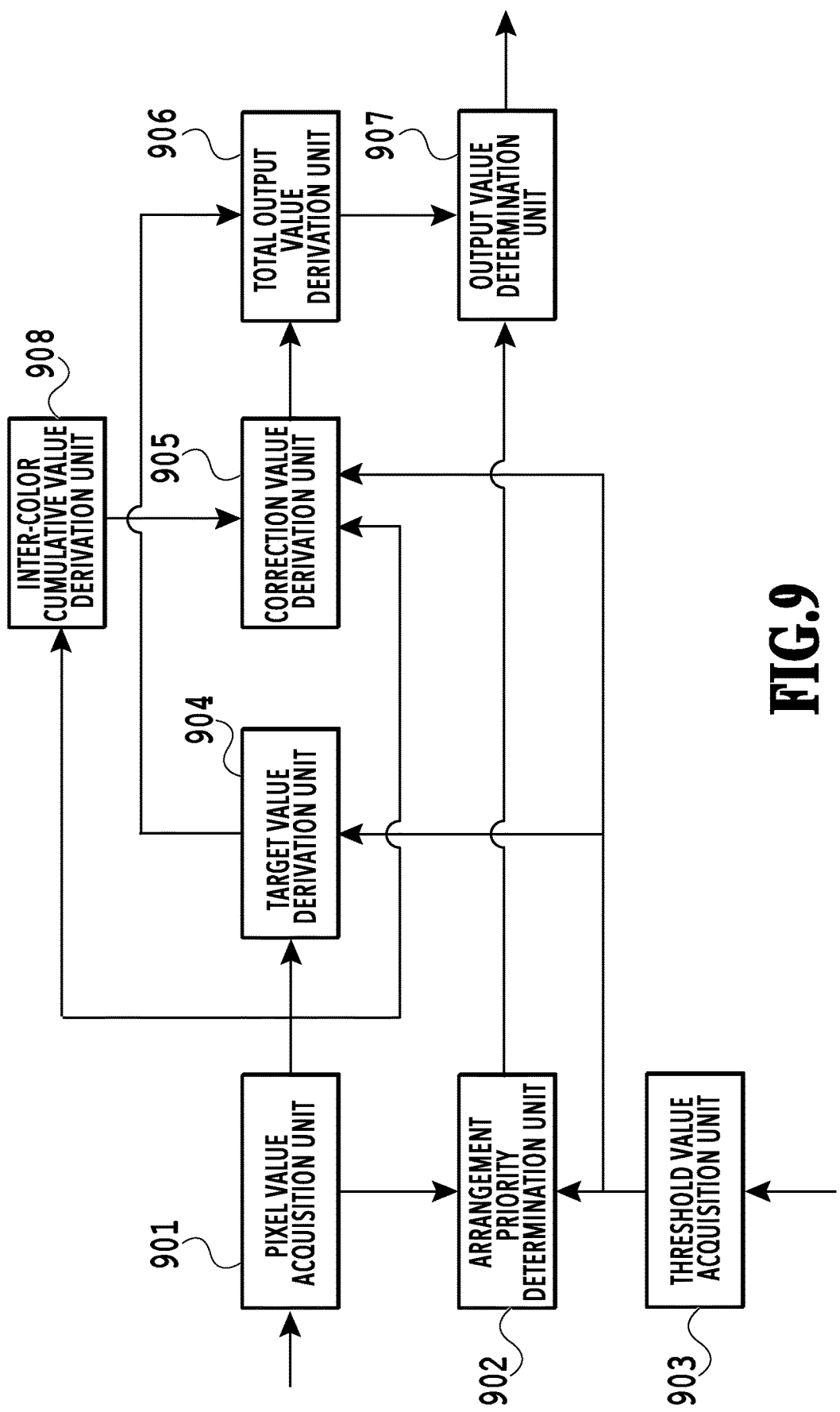
FIG. 9 is a block diagram showing a configuration of an image processing unit in the third embodiment.

An explanation is given of the image processing unit 106 according to the present embodiment. The image processing unit 106 executes halftoning for converting input image data into half-tone image data having a smaller number of tone levels than the input image data. FIG. 9 is a block diagram showing a configuration of the image processing unit 106 according to the third embodiment. The image processing unit 106 in the present embodiment is realized as a dedicated image processing circuit having the configuration shown in FIG. 9. The image processing unit 106 includes a pixel value acquisition unit 901, an arrangement priority determination unit 902, a threshold value acquisition unit 903, a target value derivation unit 904, a correction value derivation unit 905, a total output value derivation unit 906, an output value determination unit 907, and an inter-color cumulative value derivation unit 908.

To the image processing unit 106 according to the present embodiment, solid color image data obtained as a result of color separation for each color material used by the printer is input as input image data. Note that color separation is a process of converting respective image data of R, G, and B into respective image data of C, M, Y, and K, which correspond to the color materials used in the printer. In the present embodiment, the image data obtained as a result of color separation are input to the image processing unit 106 in the order of K, C, M, and Y, so that the image processing unit 106 performs image processing separately on the image data of each color. Additionally, it is assumed that the image data of each color is 8-bit data, which indicates a value from 0 to 255 for each pixel. Then, the image processing unit 106 converts the input image data of 8 bits per pixel into 1-bit binary half-tone image data (output image data) having a value of either 0 or 1 for each pixel. Thereby, half-tone image data for four colors of K, C, M, and Y are generated. In half-tone image data, a pixel having a pixel value (output value) of 0 represents "off" of a dot, and a pixel having a pixel value of 1 represents "on" of a dot. Such half-tone image data artificially reproduces input image data with the smaller number of tone levels than the number of tone levels represented by the input image data. Note that, hereinafter, half-tone image data may be referred to as dot data.

The pixel value acquisition unit 901 acquires the pixel values of multiple pixels included in a unit region (hereinafter referred to as a process region or a predetermined region), which is to be a process subject in input image data. In the present embodiment, as described above with reference to FIG. 3, a region of four by four pixels indicated by a thick frame in FIG. 3 is to be a process region as well. For example, in a case where the process region is the region 301, the pixel value acquisition unit 901 acquires each pixel value of the 16 pixels included in the region 301.

Figure 10:
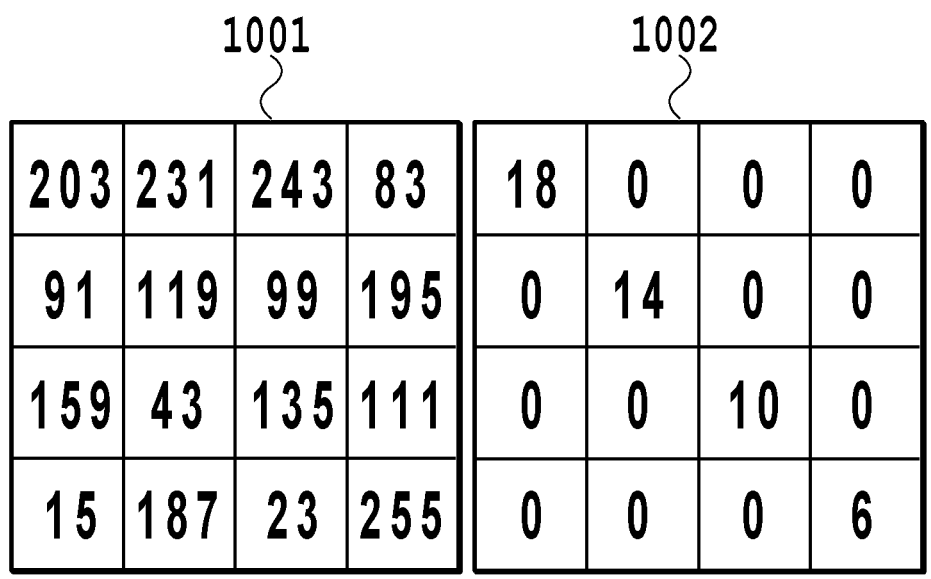
FIG. 10 is a diagram showing an example of a process region including a bright fine line and a threshold value group corresponding to the process region in the third embodiment.

The threshold value acquisition unit 903 acquires a threshold value group used for a dither process from the RAM 101 or the external storage device 105. FIG. 10 is a diagram showing an example of a process region including a bright fine line and a threshold value group corresponding to the process region in the present embodiment. In the present embodiment, it is assumed that the threshold value group 1001 shown in FIG. 10 is used for a dither process. The threshold value group 1001 is a part of a threshold value matrix stored in the RAM 101 or the external storage device 105. The threshold value acquisition unit 903 acquires the threshold value group 1001 shown in FIG. 10, each time a pixel value of a process region is read by the pixel value acquisition unit 901. Note that, although it is assumed that the same threshold value matrix is used for each color of K, C, M, and Y for simplicity of explanation in the present embodiment, a different threshold value matrix may be used for each color as well.

The target value derivation unit 904 derives a target value, which is for determining the total number of output values (total output value) in a process region, based on the pixel values of multiple pixels included in the process region and the threshold values of a threshold value group. As described above, since an output value is represented by 1 or 0 for "on" or "off" of a dot, a target value for a process region corresponds to the number of dots to be "on" in the process region. In the present embodiment, the average value of the pixel values of the respective pixels in a process region is compared with each threshold value of a threshold value group, and the number of threshold values that are smaller than the average value is derived as a target value.

The inter-color cumulative value derivation unit 908 outputs an inter-color cumulative value, which is used by the correction value derivation unit 905 to derive a correction value. An explanation of an inter-color cumulative value is given later.

The correction value derivation unit 905 derives a correction amount (correction value) for correcting a total output value, based on the pixel value of each pixel in a process region, each threshold value of a threshold value group, and an inter-color cumulative value derived by the inter-color cumulative value derivation unit 908. In the present embodiment, the correction value derivation unit 905 compares the sum of the average value of the pixel values in a process region and an inter-color cumulative value with the minimum threshold value of a threshold value group. As a result of comparison, in a case where the sum is equal to or larger than the minimum threshold, 1 is set as the correction value, and, in a case where the sum is smaller than the minimum threshold value, 0 is set as the correction value.

The total output value derivation unit 906 derives the total number of output values (total output value) for a process region, based on a target value derived by the target value derivation unit 904 and a correction value derived by the correction value derivation unit 905. In the present embodiment, the total output value derivation unit 906 derives the result of adding the target value and the correction value as the total output value.

The arrangement priority determination unit 902 determines arrangement priority that indicates on which pixel a dot is preferentially arranged in a process region, based on the pixel value of each pixel in the process region and each threshold value of a threshold value group. In the present embodiment, the arrangement priority determination unit 902 derives a difference value between a pixel value and a threshold value that are positionally corresponding to each other (here, a difference value obtained by subtracting the threshold value from the pixel value) as an evaluation value for determining the arrangement priority for a dot. Then, the arrangement priority determination unit 902 determines the arrangement priority for a dot by sorting the derived evaluation value of each pixel. In a case where an input image includes a bright fine line, there are a small number of effective pixels (not-white pixels), which configure the line, and white pixels having a pixel value of 0 occupy the majority, as indicated in the process region 1002. In addition, since each of the pixels configuring a bright fine line has a small difference in pixel value from a white pixel, the threshold values of a threshold value group have a large impact on arrangement priority for dots in such a region as indicated by the process region 1002, and, thus, there is a possibility that the arrangement priorities for white pixels become high. In a case where a dot is arranged on a white pixel, the sharpness of a generated image is deteriorated. Therefore, it is preferred that effective pixels other than while pixels are in higher priorities in arrangement priority for dots. Note that, although pixels having a pixel value of 0 are treated as white pixels in the present embodiment, pixels having a pixel value equal to or smaller than a predetermined value may be treated as white pixels, as in a publicly known background process performed on an image read by a document scanner. In that case, effective pixels are pixels having a pixel value larger than the predetermined value.

The output value determination unit 907 assigns 1 as an output value to each pixel until reaching a total output value, which is derived by the total output value derivation unit 906, based on arrangement priority for dots, which is determined by the arrangement priority determination unit 902. Pixels to which 1 is not assigned as an output value are treated as pixels to which 0 is assigned as an output value. Thereby, an output value of each pixel in a process region is determined.

Here, with reference to FIG. 10, an explanation is given of an inter-color cumulative value, which is derived by the inter-color cumulative value derivation unit 908. An inter-color cumulative value is a value accumulated each time the correction value derivation unit 905 performs the correction value derivation process for each color of K, C, M, and Y. In the present embodiment, the sum of an inter-color cumulative value and the average value of pixel values of the input image data of a channel (color plane) that is input immediately before is the inter-color cumulative value of the currently processed color plane. Note that the sum can be referred to as a cumulative average value (or a cumulative representative value) since it can be said that the sum is a value obtained by accumulating the average values of the pixel values of the input image data of each channel that have been input up to the current time. Here, a case in which the process region 1002 shown in FIG. 10 is input as the same image data for K, C, M, and Y. Here, in a case where input image data of K is input to the image processing unit 106, the inter-color cumulative value is 0 since K is the color plane that is input first. Next, in a case where input image data of C is input, the inter-color cumulative value is the sum of the inter-color cumulative value and the average value of the pixel values of the color plane K, which is input immediately before. Since the average value of the process region 1002 is 3 (=(18+14+10+6)÷16), the inter-color cumulative value is 3 (=3+0). Similarly, in a case where input image data of M is input, the inter-color cumulative value is 6 (=3+3). Further, in a case where Y is input, the inter-color cumulative value is 9 (=3+6). Note that the most preferable inter-color cumulative value of the currently processed color plane is the sum of an inter-color cumulative value and the average value of the pixel values input immediately before. However, the sum of an inter-color cumulative value and another representative value (statistics amount) such as the total value, the maximum pixel value, the median value, or the minimum value of the process region may be used as the inter-color cumulative value of the currently processed color plane. Hereinafter, an inter-color cumulative value may be referred to as a cumulative representative value. Further, the sum of an inter-color cumulative value and the value obtained by multiplying such a value as mentioned above by coefficient "a" may be used as the inter-color cumulative value of the currently processed color plane.

(Operation of Image Processing Unit 106)

Figure 11:
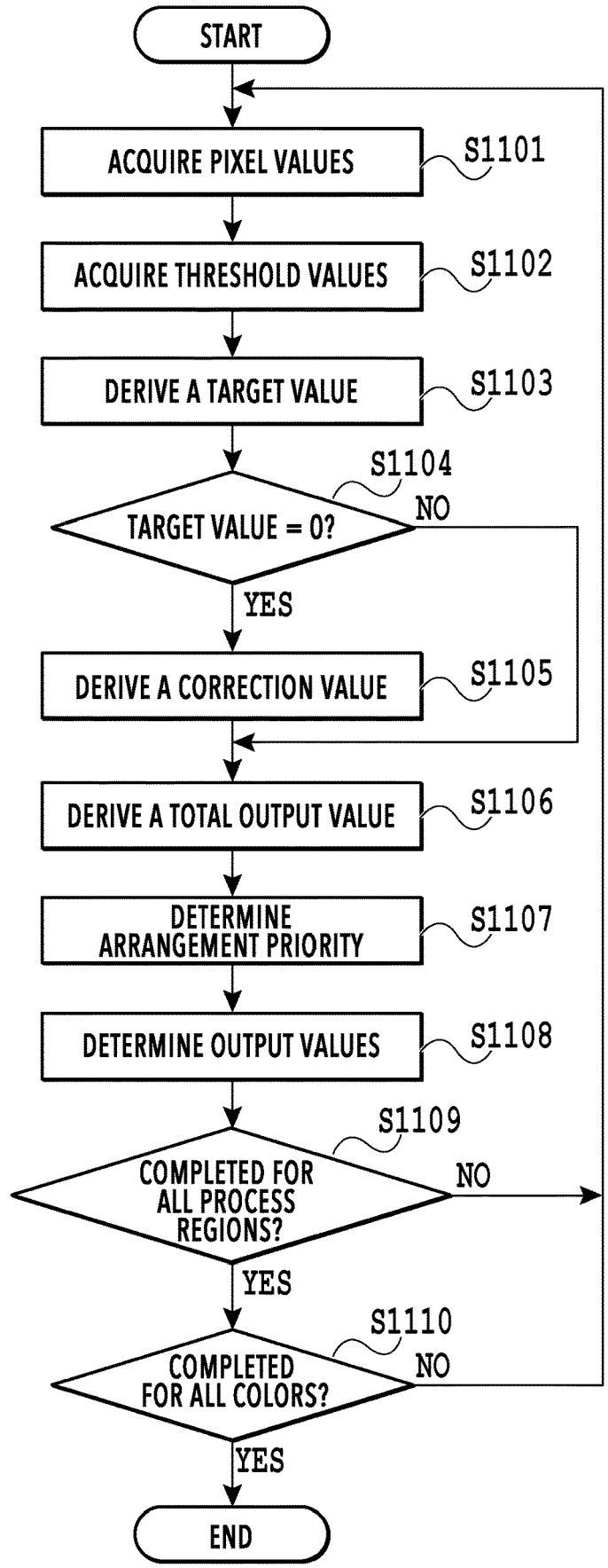
FIG. 11 is a flowchart showing processes performed by the image processing unit in the third embodiment.
Figure 12:
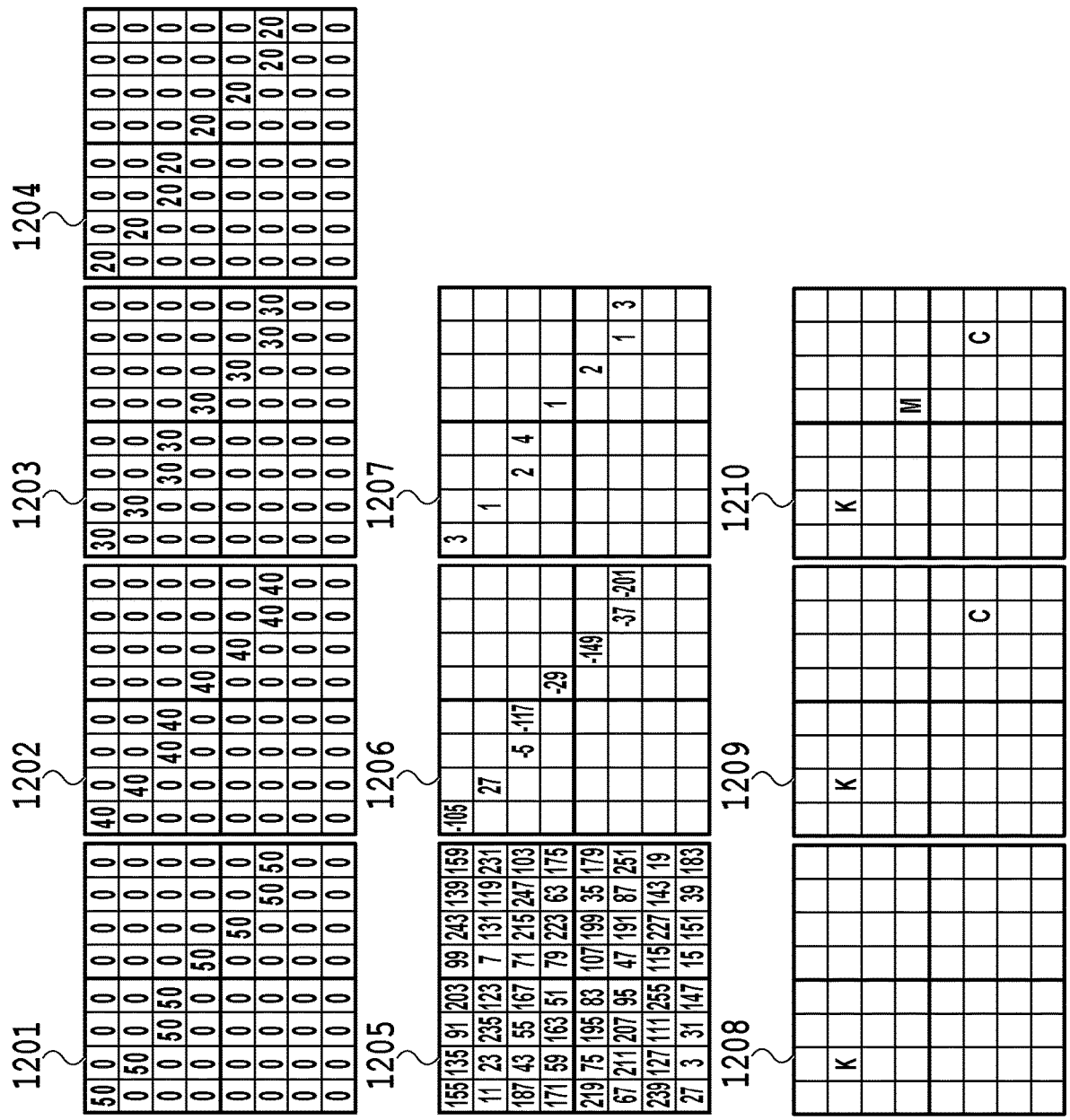
FIG. 12 is a diagram for explaining processing results obtained by the processes shown in FIG. 11.

FIG. 11 is a flowchart showing the operation of the image processing unit 106 in the third embodiment. Note that the series of processes in the flowchart shown in FIG. 11 is performed by the CPU 100 retrieving a program code stored in the ROM 102 into the RAM 101 and executing the program code. Alternatively, a part or all of the functions in the steps of FIG. 11 may be implemented by hardware such as an ASIC or an electronic circuit. Note that the symbol "S" in the explanation of each process means that it is a step in the flowchart. FIG. 12 is a diagram for explaining the processing results obtained by the processes shown in FIG. 11. Note that the output results 1208 to 1210 represent output results after halftoning, and the colors of dots to be "on" at the respective pixel positions are indicated by "K", "C", "M", and "Y". The image processing unit 106 sequentially performs the following processes of S1101 to S1110 on input image data of each color of K, C, M, and Y obtained as a result of color separation, which are acquired from the RAM 101, the external storage device 105, or the like. Note that, here, for simplicity of explanation, it is assumed that the image data 1201, 1202, 1203, and 1204 of 16 by 16 pixels shown in FIG. 12 are acquired as input image data of K, C, M, and Y, respectively. Note that the image data 1201 to 1204 correspond to a part (regions 301 to 304) of the image data 300 shown in FIG. 3. Furthermore, it is assumed that the size of a process region is four by four pixels and the processes are executed on each of the input image data in the order of the upper left region, the upper right region, the lower left region, and the lower right region. Note that the size of a process region is not limited to the above-mentioned size. In addition, the execution sequence of the processes performed on a process region is not limited to the above-mentioned order.

First, the pixel value acquisition unit 901 acquires the pixel value of each pixel in a process region from input image data (S1101). Next, the threshold value acquisition unit 903 acquires a threshold value group corresponding to the process region from the RAM 101 or the external storage device 105 (S1102). The same threshold value matrix 1205 shown in FIG. 12 is used for the input image data 1201 to 1204. Therefore, here, a threshold value group at the position corresponding to the process region is acquired from the threshold value matrix 1205. Note that a different threshold value matrix may be used for each color plane. Furthermore, since the processes of S1101 and S1102 do not depend on each other, either may be executed first and the processes may be executed in parallel.

Next, based on the pixel values acquired in S1101 and the threshold values acquired in S1102, the target value derivation unit 904 derives a target value of the process region (the target value of the total number of pixels in which dots are to be "on" in the process region) (S1103). Here, the target value derivation unit 904 calculates the average value of all the pixels in the process region and compares the calculated average value with each of the threshold values in the threshold value group, so as to derive the target value, which is the number of threshold values that are smaller than the average value. In a case where the upper left region of the input image data 1201 is the process region, the obtained average value of the pixels in the process region is 12.5. Furthermore, since there is only one threshold value (11) that is smaller than 12.5 among the threshold value group corresponding to the process region in the threshold value matrix 1205, the target value is 1. As for the cases in which each of the upper right region, the lower left region, and the lower right region is the process region, 0 is derived as the target value, based on calculation in the same manner.

Next, the image processing unit 106 determines whether or not the correction value derivation unit 905 executes correction value derivation (S1104). Specifically, in a case where the target value derived in S1103 is smaller than the criterial number of dots (YES in S1104), the image processing unit 106 proceeds to the process of S1105. In the present embodiment, it is assumed that the criterial number of dots is 1. Note that the criterial number of dots is not limited to 1 and may be changed according to the size of a process region. Therefore, in a case where the target value is 0, the process proceeds to S1105. On the other hand, in a case where the target value is not 0 (NO in S1104), the image processing unit 106 sets 0 as the initial value of the correction value and proceeds to the process of S1106. The purpose of the present embodiment is to improve visibility of a bright fine line. Therefore, the correction value is not derived in a region of which the target value is 1 or more, which is assumed to be a higher density region where no bright fine line is present, and the correction value is derived only in a lower density region of which the target value is 0.

Next, the correction value derivation unit 905 derives the correction value (the correction amount for the target value) for the process region, based on the pixel values acquired in S1101, the threshold values acquired in S1102, and the inter-color cumulative value derived by the inter-color cumulative value derivation unit 908 (S1105).

Figure 13:
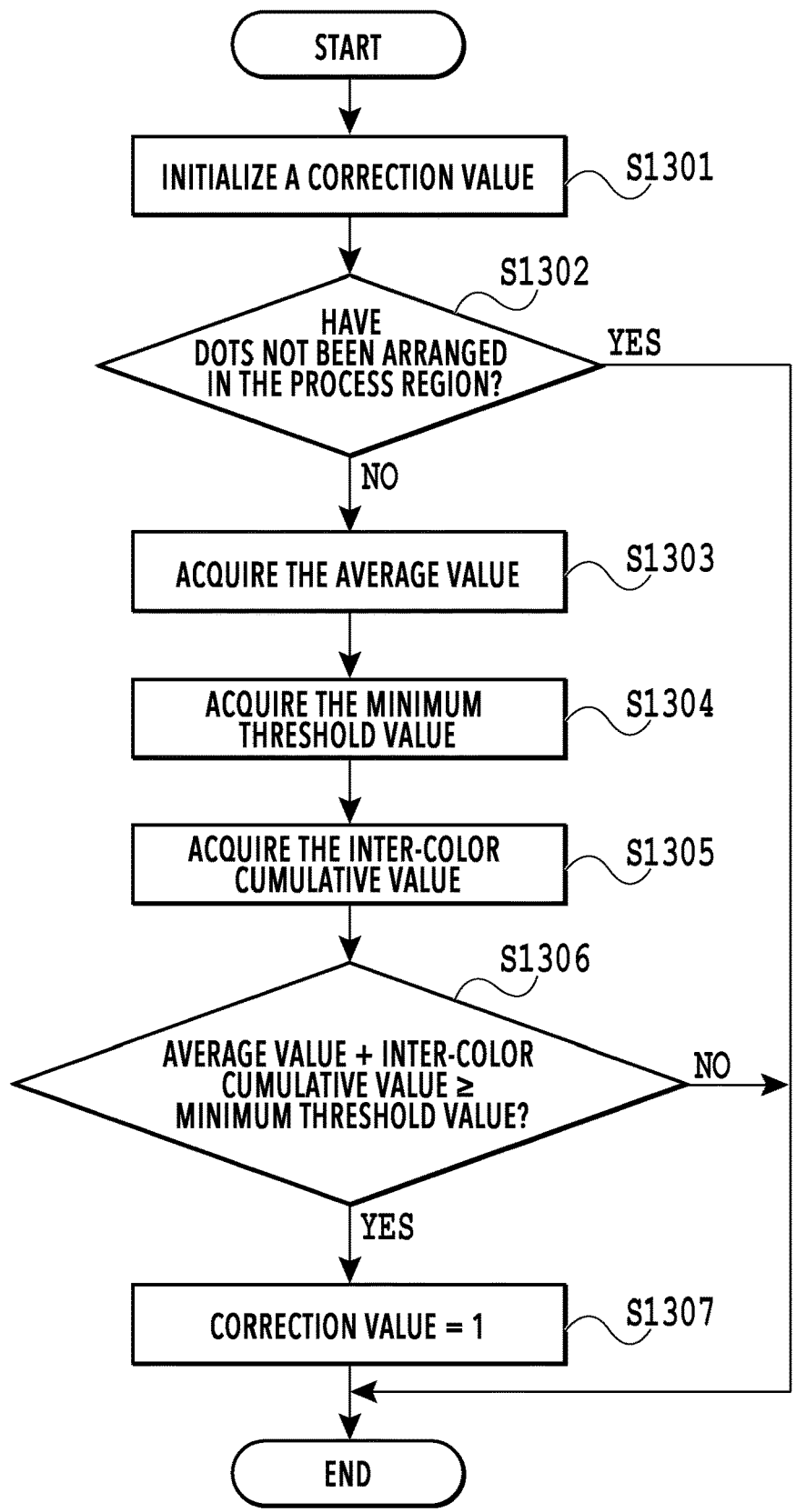
FIG. 13 is a flowchart showing processes performed by a correction value derivation unit in the third embodiment.

Here, an explanation is given of the correction value derivation process executed by the correction value derivation unit 905 in S1105. FIG. 13 is a flowchart showing the processes of the correction value derivation unit 905 in the third embodiment. First, the correction value derivation unit 905 sets 0 as the correction value to initialize the correction value (S1301). Next, the correction value derivation unit 905 determines whether dots have not been arranged in the process region as well as the identical process regions of other color planes (S1302). In a case where dots have been arranged (YES in S1302), the correction value derivation unit 905 ends the processes. The purpose of the present embodiment is to prevent disappearance of a bright fine line and improve reproducibility. Therefore, for the process region where dots have already been arranged, it is determined that a line is continuous to some extent (a bright fine line has not disappeared) or that the line is not a bright fine line in other colors. Accordingly, to avoid excessive correction processing, the correction value derivation process is ended.

Next, the correction value derivation unit 905 acquires the average value of the pixel values in the process region and the minimum threshold value of the threshold value group (S1303, S1304). Further, the correction value derivation unit 905 acquires the inter-color cumulative value (S1305). Next, the correction value derivation unit 905 compares the sum of the average value of the pixel values acquired in S1303 and the inter-color cumulative value acquired in S1305 with the minimum threshold value of the threshold value group acquired in S1304. In a case where the sum of the average value of the pixel values and the inter-color cumulative value is equal to or larger than the minimum threshold value of the threshold value group (YES in S1306), the correction value derivation unit 905 sets 1 as the correction value (S1307). On the other hand, in a case where the sum is smaller than the minimum threshold value (NO in S1306), the correction value derivation unit 905 ends the processes.

Returning back to FIG. 11, the explanation thereof is continued. After S1105, the total output value derivation unit 906 derives the number of pixels (total output value) in which dots are to be "on" in the process region, based on the target value derived in S1103 and the correction value derived in S1105 (S1106). Here, the sum of the target value and the correction value is derived as the total output value. In such a case in which the target value is 0 as in the upper right, lower left, or lower right process region of the input image data 1201, the correction value is directly set as the total output value. Note that, here, the value range of the target value is 0 to 16 whereas the value range of the correction value is 0 or 1. Thus, there may be a configuration in which the branching process in S1104 is omitted and the larger value of the target value and the correction value is adopted as the total output value in S1106. In that case, since the correction value is reflected to the total output value in S1106 in a case where the target value is 0, the same processes as the processes shown in FIG. 11 are performed.

Next, for the pixels in which dots are to be "on" in the process region, the arrangement priority determination unit 902 determines the priority order in which dots of the pixels become "on" (S1107). That is, the arrangement priority determination unit 902 determines the arrangement priority of dots to be arranged in the process region. Here, first, the arrangement priority determination unit 902 derives the evaluation value of each pixel position by subtracting the threshold value of the corresponding pixel position from the pixel value of each pixel position in the process region. Next, the arrangement priority determination unit 902 sorts the derived evaluation values in descending order and determines the sorted result as the arrangement priority. For example, an evaluation value group is derived, based on the input image data 1201 to 1204 and the threshold value matrix 1205. Here, the evaluation values are derived only for the pixels having effective pixels. Furthermore, since the pixel values of the effective pixels in image data are all the same in any of the input image data 1201 to 1204 of the respective color plane, the same evaluation value group 1206 is derived for K, C, M, and Y, so that the arrangement priority for dots is determined. The arrangement priority data 1207 is data representing the arrangement priority for dots that is determined herein. Note that, here, for simplicity of explanation, the case in which the same evaluation value group 1206, which is derived for K, is used for K, C, M, and Y is taken as an example. However, in a case where the pixel values of effective pixels in image data are different in each of the input image data of each color plane, an evaluation value group may be derived for each color plane.

Next, the output value determination unit 907 sets 1 as the output value for corresponding pixels according to the arrangement priority determined in S1107, so that the number of dots indicated by the total output value obtained in S1106 become "on" (S1108). For the other pixels, the output value determination unit 907 sets 0 is as the output values, so that the dots thereof are to be "off".

After S1108, the image processing unit 106 determines whether the processes have been completed for all the process regions (S1109). In a case of not being completed (NO in S1109), the image processing unit 106 returns to the process of S1101 and repeats the processes of S1101 to S1108. In a case of being completed (YES in S1109), the image processing unit 106 determines whether the processes have been completed for all colors of K, C, M, and Y (S1110). In a case of not being completed (NO in S1110), the image processing unit 106 returns to the process of S1101 and repeats the processes of S1101 to S1109. In a case of being completed (YES in S1110), the image processing unit 106 ends the processes.

An explanation is given of the output results obtained in a case where the processes shown in FIG. 11 are executed on each input image data (image data 1201 to 1204) of K, C, M, and Y in order. Note that, as for the lower left process region, since the number of effective pixels is 0, an arrangement priority is not determined in S1107 and no dot is arranged. Therefore, an explanation thereof is omitted. First, in a case where input image data of K is input, since the average value (50×4+16=12.5) is larger than the minimum threshold value (11) in the upper left process region, the target value of K is 1. Since the target value of K derived by the target value derivation unit 904 is 0 in the upper right and lower right process regions, the correction values derived by the correction value derivation unit 905 directly become the total output values. Here, since the sum of the average value and the inter-color cumulative value (3.125+0=3.125) is smaller than the minimum threshold (7) in the upper right process region, the correction value of K is 0. Further, since the sum of the average value and the inter-color cumulative value (9.375+0=9.375) is smaller than the minimum threshold value (15) in the lower right process region, the correction value of K is 0. Therefore, upon completion of the processes for the input image data of K, one K dot is arranged in the upper left process region, as shown in the output result group 1208. Next, in a case where input image data of C is input, since the target values of C derived by the target value derivation unit 904 are 0 in the upper left, upper right, and lower right process regions, the correction values derived by the correction value derivation unit 905 directly become the total output values. Here, since a K dot has already been arranged in the upper left process region, the correction value of C is set to 0 due to the branching process in S1302. Further, since the sum of the average value and the inter-color cumulative value (2.5+3.125=5.625) is smaller than the minimum threshold value (7) in the upper right process region, the correction value of C is 0. Further, since the sum of the average value and the inter-color cumulative value (7.5+9.375=16.875) is equal to or larger than the minimum threshold value (15) in the lower right process region, 1 is set as the correction value. Therefore, upon completion of the processes for the input image data of C, one K dot is arranged in the upper left process region and one C dot is arranged in the lower right process region, as shown in the output result group 1209. Similarly, in a case where the processes are performed on the input image data of M and Y, the output result group 1210 in which one K dot is arranged in the upper left process region, one M dot is arranged in the upper right process region, and one C dot is arranged in the lower right process region is finally obtained.

Hereinafter, an explanation is given of the effect of the present embodiment. First, in a case where the correction value derivation process is not performed by the correction value derivation unit 905, the number of dots to be arranged in each of the upper right, lower left, and lower right process regions is all 0. Therefore, the visibility of the bright fine line in the input image data 1201 is significantly reduced after halftoning. That is, the shape of an object in input image data is not retained. Further, in a case of comparing the average value and the minimum threshold value independently for each color plane without taking the inter-color cumulative value into account at the time of deriving the correction value, since the average values of K, C, M, and Y all fall below the minimum threshold value (7) in the upper right process region, no dots are arranged. Similarly, no dots are arranged in the lower right process region. Therefore, in such an image after halftoning as shown in the output result 1210 of FIG. 12, M dots and C dots are not recorded, and a bright fine line is reproduced with only K dots. On the other hand, in the present embodiment in which an inter-color cumulative value is taken into account at the time of deriving a correction value, a M dot and a C dot are recorded in the upper right and lower right process regions as in the output result 1210, respectively, so that the color tone of the bright fine line is adjusted.

Note that it is possible to execute the process of S1107 (arrangement priority determination process) any time after pixel values included in a process region and a threshold value matrix are acquired in the processes of S1101 and S1102. Further, the process of S1107 and the processes of S1103 to S1106 do not depend on each other. Therefore, either the process of S1107 or the processes of S1103 to S1106 may be executed first. Further, the processes may be executed in parallel.

Additionally, the essential point of the present embodiment is that correction processing taking an inter-color cumulative value into account is additionally performed at the time of determining a total output value. Therefore, the present embodiment can also be applied to an image forming system configured to derive the total number of output values in a predetermined region and determine arrangement of dots separately from the derivation of the total number of output values.

Fourth Embodiment

In the third embodiment, an explanation has been given of the configuration in which, in a case where a dot of another color plane has already been arranged in the identical process region when the correction value derivation unit 905 derives a correction value, the derivation of a correction value is not performed. In the third embodiment, such a configuration prevents a bright fine line from being excessively emphasized and the brightness from changing greatly. In the present embodiment, an explanation is given of a configuration in which change in brightness is allowed to some extent, so as to facilitate adjustment of the color tone of a bright fine line.

The configuration and operation of the image processing unit 106 of the fourth embodiment are the same as those of the third embodiment. However, as shown in FIG. 14, the operations of the correction value derivation unit 905 and the arrangement priority determination unit 902 are different from those of the third embodiment.

Figure 14:
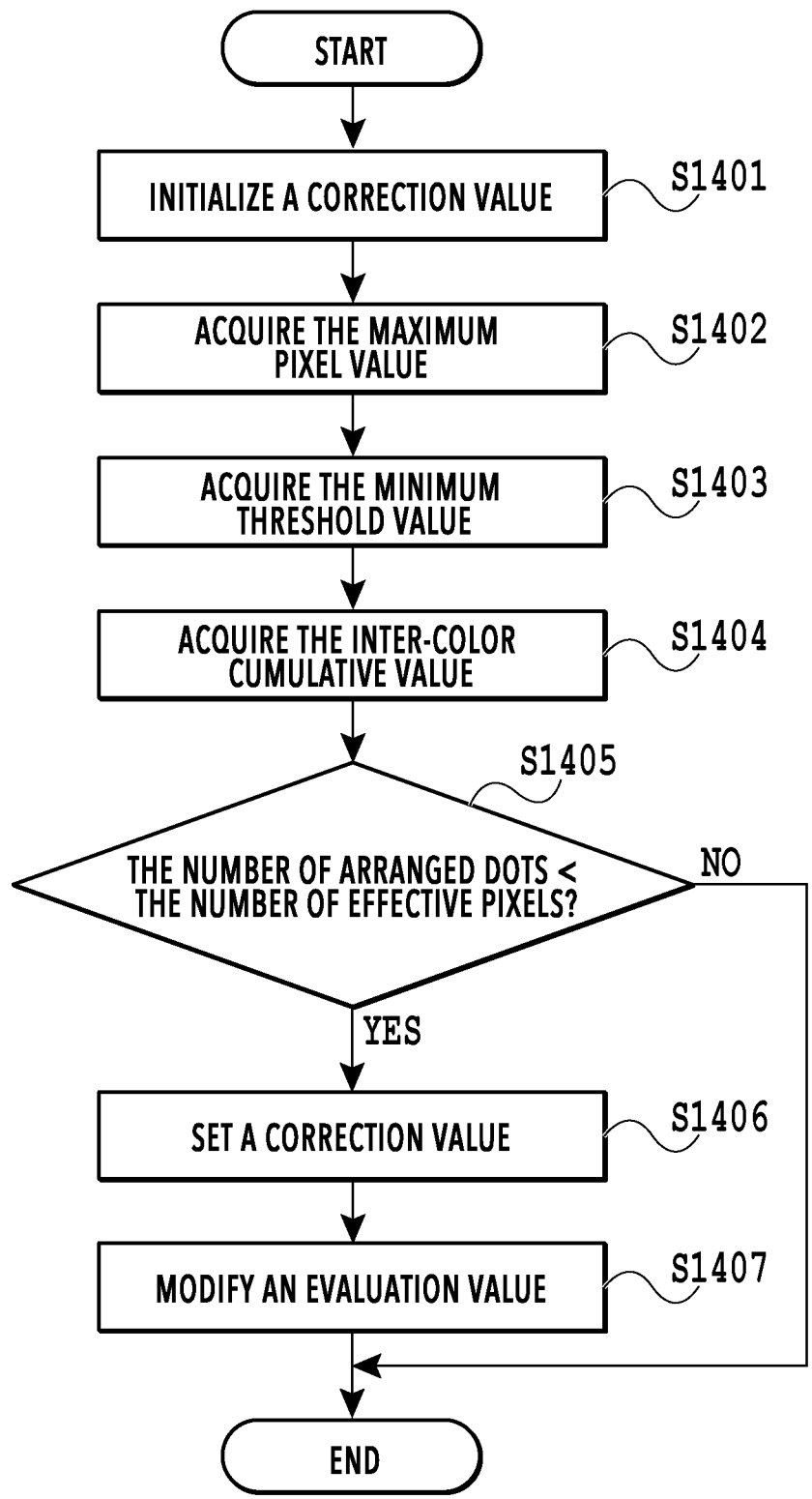
FIG. 14 is a flowchart showing processes performed by a correction value derivation unit in the fourth embodiment.

FIG. 14 is a flowchart showing the processes of the correction value derivation unit 905 in the fourth embodiment. In the correction value derivation process in the third embodiment, in a case where it is determined in S1302 that a dot of another color plane has already been arranged in the identical process region, the processes are ended and the value range of the correction value is set to 0 or 1, so that the brightness does not change greatly. However, in the present embodiment, a process corresponding to the branching process in S1302 of the third embodiment is not performed, and the value range of a correction value is enlarged to 0 to 16. Thereby, it is possible to increase the number of dots that can be arranged in a process region, so as to facilitate adjustment of a color tone. Note that, since the processes of S1401, S1403, and S1404 are the same as the processes of S1301, S1304, and S1305 of the third embodiment, the explanation thereof is omitted.

In S1402, the correction value derivation unit 905 acquires the largest pixel value among the pixel values of the respective pixels in a process region as the maximum pixel value.

Further, after the process of S1404, the correction value derivation unit 905 determines whether or not the number of dots arranged in the process region is smaller than the number of effective pixels (S1405). In a case where the number of dots arranged in the process region is equal to or larger than the number of effective pixels (NO in S1405), the correction value derivation unit 905 ends the processes. Thereby, the maximum number of dots arranged in a process region can be limited to the number of effective pixels, that is, the total output value (the sum of a target value and a correction value) can be made smaller than the number of effective pixels. Accordingly, in S1108, in a case where the output value determination unit 907 arranges dots in accordance with the arrangement priority determined in S1107, it is possible to prevent dots from being arranged in pixels whose pixel value is 0. Therefore, it is possible to inhibit sharpness of an image from being deteriorated.

In a case where the number of dots arranged in the process region is smaller than the number of effective pixels (YES in S1405), the correction value derivation unit 905 sets a correction value (S1406). In the third embodiment, the correction value is set to 1 in a case where the sum of the average value of the pixel values of the respective pixels in a process region and the inter-color cumulative value of the process region is equal to or larger than the minimum threshold value in the process region. On the other hand, in the present embodiment, the sum of the maximum pixel value and the inter-color cumulative value of a process region is compared with each threshold value of a threshold value group, and the difference between the number of threshold values that are smaller than the sum and the number of dots that have already been arranged in the process region is set as the correction value. Finally, the correction value derivation unit 905 modifies an evaluation value derived by the arrangement priority determination unit 902 (S1407). Here, to avoid a dot from being arranged in a pixel in which a dot has already been arranged in a process region, the correction value derivation unit 905 sets the evaluation value of such a pixel to the minimum value (=0–the maximum value that a threshold value can take).

Next, an explanation is given of the process of the arrangement priority determination unit 902 (arrangement priority determination process of S1107) in the present embodiment. In the third embodiment, because of the branching process of S1302, the sum of the correction values derived for each color plane in the identical process region is 1 at the maximum over all color planes. On the other hand, since the value range of a correction value is enlarged to 0 to 16 in the present embodiment, multiple dots can be arranged in the identical process region. However, in a case where the same arrangement priority for dots, which is determined in the arrangement priority determination process of S1107, is used for all color planes, there is a possibility that dots overlap in multiple color planes and the color tone is changed due to the overlapping dots, which makes it difficult to reproduce the color tone. Therefore, at the time of determining the arrangement priority of dots in S1107, the arrangement priority determination unit 902 of the present embodiment controls the layout positions of dots such that the dots are not arranged at the same position in multiple color planes. Specifically, the arrangement priority determination unit 902 treats dots that are arranged as a result of the correction processing in a certain color plane in the same manner as white pixels at the time of determining the arrangement priority of dots in another color plane, so as to control the dots not to be arranged in an overlapping manner.

With reference to FIG. 15, a detail explanation is given of the arrangement priority determination process of the present embodiment. Here, the case in which the threshold value group 1501 is acquired in S1101 and the image data 1502 and 1503 are acquired in S1102 is taken as an example. The image data 1502 is input image data of K, M, or Y obtained as a result of color separation. The image data 1503 is input image data of C obtained as a result of color separation. Here, in S1107, such an arrangement priority as represented by the arrangement priority data 1504 is determined for all input image data of K, C, M, and Y. Further, the average values of the input image data 1502 and 1503 are 2 and 4, respectively, and there is no threshold value that is smaller than the average values in the threshold value group 1501. Therefore, the target values thereof are 0. Thus, the correction values are directly reflected in the total output values. Further, since a cumulative value of the maximum pixel values in a process region is used as an inter-color cumulative value in the present embodiment, the inter-color cumulative values of K, C, M, and Y are 0, 8, 24, and 32, respectively.

In the arrangement priority determination process for the input image data of K, since it is determined, in S1405, that the number of dots arranged in the process region (0) is smaller than the number of effective pixels (4), the process of S1406 (correction value setting processing) is executed. Here, since the additional value of the maximum pixel value (8) and the inter-color cumulative value (0) is 8, there is only one threshold value (7) that is smaller than the additional value in the threshold value group. Therefore, based on the number of threshold values that are smaller than the additional value (1) and the number of already arranged dots (0), 1 (=1−0) is set as the correction value for K, and, thus, the number of K dots becomes 1. Next, in the arrangement priority determination process for the input image data of C, since the additional value of the maximum pixel value (16) and the inter-color cumulative value (8) is 24, there are three threshold values (7, 15, and 23) that are smaller than the additional value in the threshold value group. Since the number of already arranged dots is 1, 2 (=3−1) is set as the correction value for C, and, thus, the number of C dots becomes 2. Similarly, in the arrangement priority determination process for the input image data of M, since the additional value of the maximum pixel value (8) and the inter-color cumulative value (24) is 32, there are four threshold values (7, 15, 23, and 31) that are smaller than the additional value in the threshold value group. Since the number of already arranged dots, which is the sum of the K dot (1) and the M dots (2), is 3, 1 (=4-3) is set as the correction value for M, and, thus, the number of M dots becomes 1. On the other hand, in the arrangement priority determination process for the input image data of Y, since the number of already arranged dots (4) is equal to the number of effective pixels (4), the processes of S1406 and S1407 are not executed. Therefore, 0, which is the initial value, is set as the correction value for Y. As a result, the numbers of dots to be arranged for K, C, M, and Y are 1, 2, 1, and 0, respectively. Further, dots are arranged in the order of K, C, M, and Y according to the numbers of dots and the arrangement priority, and, thus, the output result group 1505 is finally obtained. As shown in FIG. 15, according to the correction value derivation process of the present embodiment, since a value (4 in the example shown in FIG. 15) that is larger than 1 can be set as the total output value in a low-tone process region of which the target value is 0, a process for greatly changing the brightness is performed. On the other hand, in the output result group 1505, the number of C dots, which correspond to the input image data having a high number of tone levels, is larger than that of the other color planes, and the color tone of C is emphasized. That is, according to the correction value derivation process of the present embodiment, the color tone of input image can be easily reflected in an output result even in a case where a low-tone region is the target area.

Fifth Embodiment

In the fourth embodiment, an explanation has been given of the configuration for facilitating adjustment of color tone by enlarging the value range of a correction value derived for each process region. In such a method of deriving a correction value for each process region as in the fourth embodiment, the maximum pixel value in the process region and the minimum threshold value are compared. Therefore, it is possible to determine the correction value regardless of the phase of the dither matrix and to increase the probability for dots to be arranged. On the other hand, in such a method as described above in which a correction value is determined based on a low-frequency component in a process region such as the average value or the maximum pixel value in the process region, there is a possibility that reproducibility of high-frequency color tone for each pixel is reduced. Therefore, in the present embodiment, an explanation is given of a method in which an inter-color cumulative value is taken into account for determining "on" or "off" of a dot for each pixel in a low-density input image data of which the target value is 0, so as to enhance reproducibility of the color tone of a bright fine line.

(Configuration of Image Processing Unit 106)

Figure 16:
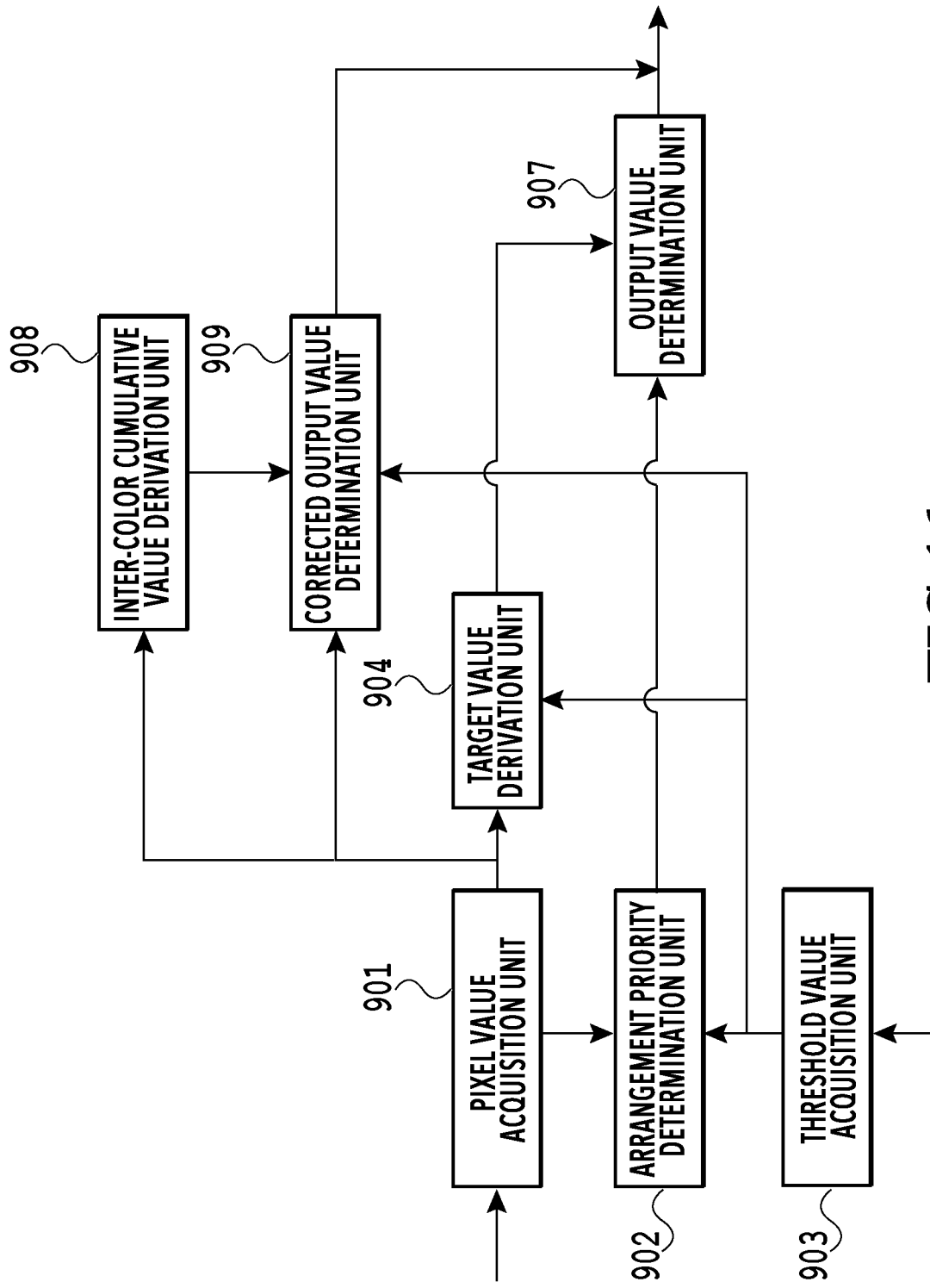
FIG. 16 is a block diagram showing a configuration of an image processing unit in the fifth embodiment.

An explanation is given of the configuration of the image processing unit 106 according to the present embodiment. FIG. 16 is a block diagram showing the configuration of the image processing unit 106 according to the fifth embodiment. As shown in FIG. 16, the configuration of the image processing unit 106 according to the present embodiment is different from the configurations of the third embodiment and the fourth embodiment in such aspects that the correction value derivation unit 905 and the total output value derivation unit 906 are not included and that a corrected output value determination unit 909 is newly added.

The corrected output value determination unit 909 determines a corrected output value, based on a pixel value of a process region acquired by the pixel value acquisition unit 901, a threshold value acquired by the threshold value acquisition unit 903, and an inter-color cumulative value derived by the inter-color cumulative value derivation unit 908. Here, the corrected output value determination unit 909 determines the corrected output value so as to obtain output image data to be output by the image processing unit 106. Details of the operation of the corrected output value determination unit 909 is explained later.

(Operation of Image Processing Unit 106)

In the image processing unit 106 of the third embodiment, the total output value derivation unit 906 derives a total output value by use of a correction value derived by the correction value derivation unit 905, and the output value determination unit 907 determines an output value in accordance with the arrangement priority determined by the arrangement priority determination unit 902. However, in the present embodiment, in a case where the target value is 0, the corrected output value determination unit 909 determines a corrected output value by use of arrangement information, which indicates the arrangement state of dots that have already been arranged in another color plane. On the other hand, in a case where the target value is not 0, the output value determination unit 907 determines an output value, based on the target value and the arrangement priority. Hereinafter, with reference to FIG. 17, an explanation is given of the operation of the image processing unit 106 according to the present embodiment.

Figure 17:
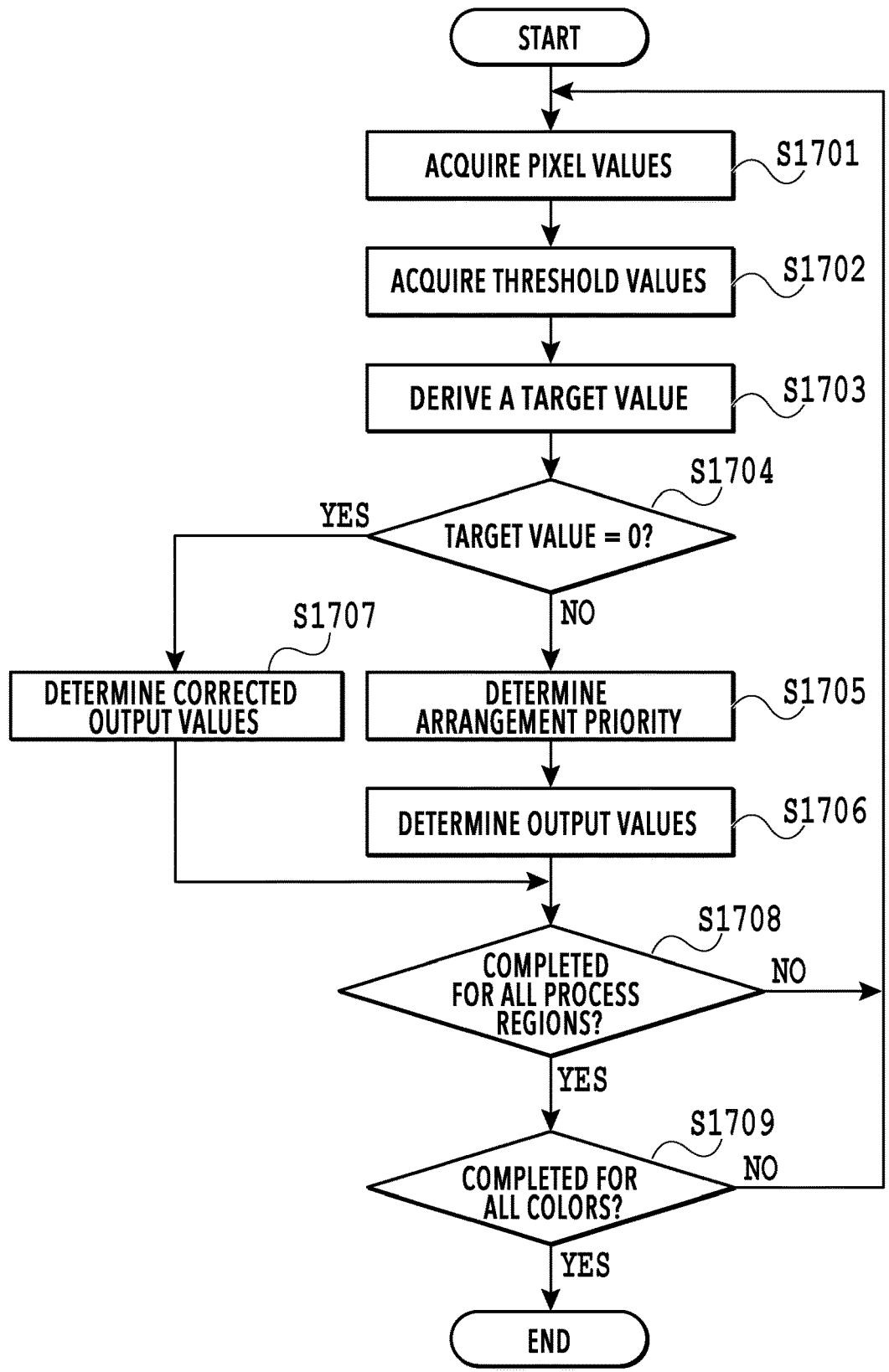
FIG. 17 is a flowchart showing operation of the image processing unit in the fifth embodiment.

FIG. 17 is a flowchart showing the operation of the image processing unit 106 in the fifth embodiment. Note that the series of processes in the flowchart shown in FIG. 17 is performed by the CPU 100 retrieving a program code stored in the ROM 102 into the RAM 101 and executing the program code. Alternatively, a part or all of the functions in the steps of FIG. 17 may be implemented by hardware such as an ASIC or an electronic circuit. In the present embodiment, processes corresponding to S1105 and S1106 of the third embodiment and the fourth embodiment are not performed. Furthermore, in the present embodiment, the process of S1707 is added as a new process. Note that, since the processes of S1701 to S1703, S1708, and S1709 are the same as the processes of S1101 to S1103, S1109, and S1110 of the fourth embodiment, the explanation thereof is omitted.

Figure 18:
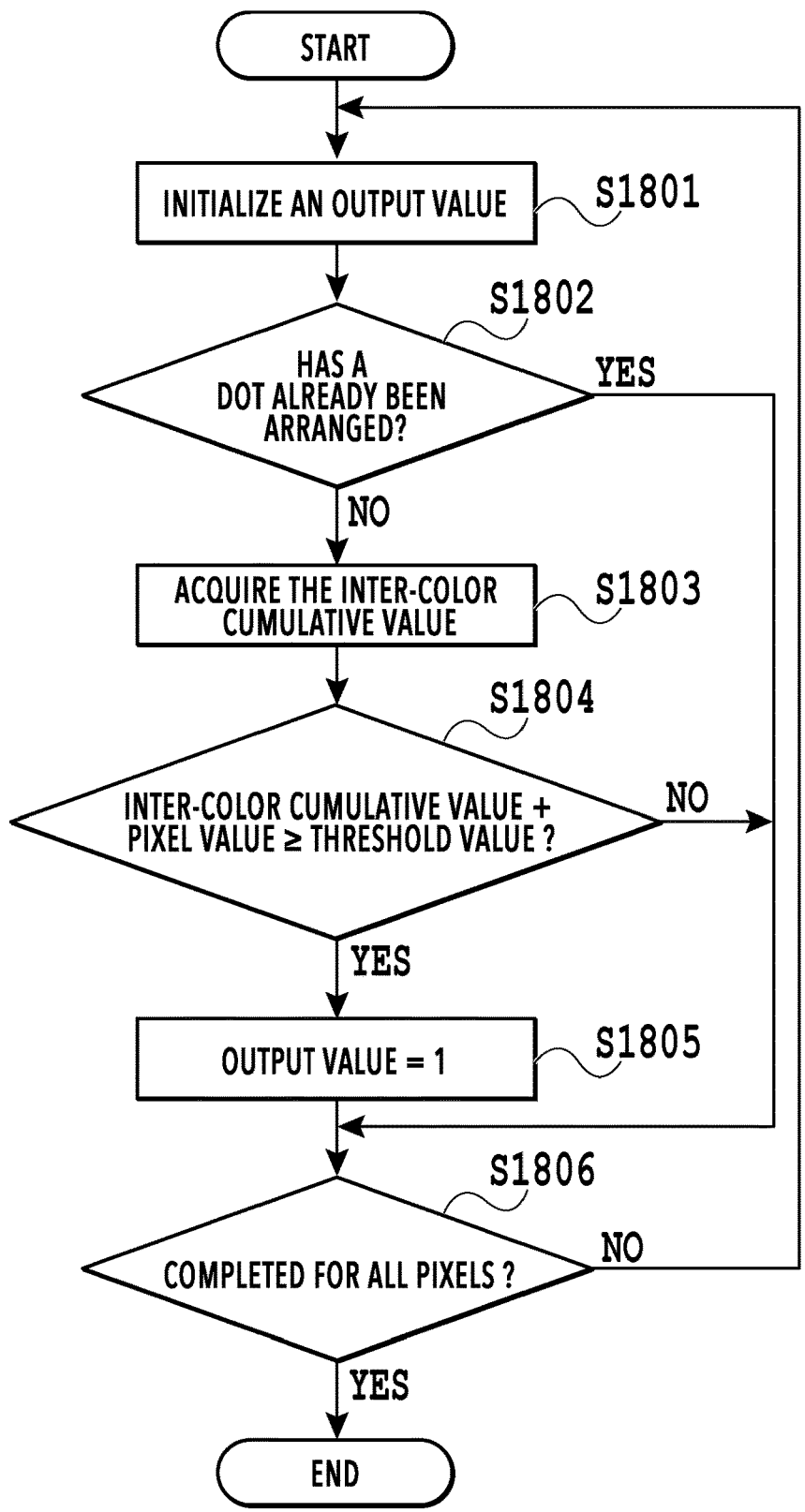
FIG. 18 is a diagram for explaining processes performed by a corrected output value determination unit in the fifth embodiment.

In a case where the target value is not 0 in S1704 (NO in S1704), the arrangement priority determination unit 902 executes an arrangement priority determination process (S1705). Note that this process is the same as the process of S1107 in the third embodiment. Then, the output value determination unit 907 sets 1 as the output value for corresponding pixels according to the arrangement priority determined in S1705, so that the number of dots indicated by the target value derived in S1703 become "on" (S1706). For the other pixels, the output value determination unit 907 sets 0 is as the output values, so that the dots thereof are to be "off". On the other hand, in a case where the target value is 0 (YES in S1704), the corrected output value determination unit 909 determines the output value, based on the pixel value acquired in S1701 and the threshold value acquired in S1702 (S1707). Here, with reference to FIG. 18, an explanation is specifically given of the process of S1707. The processes shown in FIG. 18 are executed in order for each pixel in a process region.

First, the corrected output value determination unit 909 initializes the output value to be set for the process subject pixel (target pixel) to 0, which represents "off" of a dot (S1801). Next, the corrected output value determination unit 909 determines whether a dot has already been arranged at the position of the target pixel in the process region as a result of the processes for another color plane (S1802). In a case where a dot has already been arranged (YES in S1802), the corrected output value determination unit 909 proceeds to the process of S1806. In a case where a dot has not been arranged (NO in S1802), the corrected output value determination unit 909 acquires the inter-color cumulative value (hereinafter also referred to as a cumulative pixel value) of the target pixel (S1803). Next, the corrected output value determination unit 909 determines whether the sum of the inter-color cumulative value acquired in S1803 and the pixel value of the target pixel is larger than the threshold value corresponding to the position of the target pixel (S1804). In a case where the sum is smaller than the threshold value (NO in S1804), the corrected output value determination unit 909 proceeds to the process of S1806. In a case where the sum is equal to or larger than the threshold value (YES in S1804), the corrected output value determination unit 909 sets 1, which represents "on" of a dot, as the output value of the target pixel (S1805). Then, the corrected output value determination unit 909 confirms whether the processes have already been executed for all the pixels in the process region (S1806). In a case where the processes have already been executed for all the pixels (YES in S1806), the corrected output value determination unit 909 ends the processes. In a case where an unprocessed pixel is present (NO in S1806), the corrected output value determination unit 909 selects a pixel to be the process subject from unprocessed pixels and repeats the processes of S1801 to S1806 on the selected pixel as the target pixel.

Hereinafter, with reference to FIG. 19, an explanation is specifically given of the operation of the image processing unit 106 according to the present embodiment. Here, the case in which the threshold value group 1902 is acquired in S1701 and the same input image data 1901 is acquired for K, C, M, and Y in S1702 is taken as an example. Here, since the average value of the input image data 1901 is 4 (=16× 4+16), which is smaller than the minimum threshold value (11) of the threshold value group 1902, 0 is derived as the target value in S1703. Therefore, in S1707, the corrected output value determination unit 909 determines a corrected output value for each color. Note that, here, it is assumed that the input image data are processed in the order of K, C, M, and Y. In the corrected output value determination process for the input image data of K, the inter-color cumulative value data 1903 is obtained in the process of S1803 (inter-color cumulative value acquisition process). Further, since the additional value of the pixel value (16) and the inter-color cumulative value (0) is 16, which is larger than the threshold value (11), a K dot is arranged at the pixel position where the threshold value (11) is set. The output result data 1907 represents the output result obtained as a result of the corrected output value determination process for the input image data of K. In the corrected output value determination process for the input image data of C, the inter-color cumulative value data 1904 is obtained in the process of S1803. Note that, because of the process of S1802, since the subsequent processes are not executed for the pixel in which a K dot has already been arranged, the pixel in which a K dot has already been arranged is treated in the same way as white pixels, which means that the inter-color cumulative value thereof is invalidated as indicated by the inter-color cumulative value data 1904. Further, since the additional value of the pixel value (16) and the inter-color cumulative value (16) is 32, which is larger than the threshold value (23), a C dot is arranged at the pixel position where the threshold value (23) is set. The output result data 1908 represents the output result obtained as a result of the corrected output value determination process for the input image data of C. The corrected output value determination process is similarly performed on the input image data of M and Y, so that the output results data 1909 and 1910 are derived based on the inter-color cumulative value data 1905 and 1906.

Note that, although the most preferable process flow in the present embodiment is the method shown in FIG. 17, it is also possible to perform the process of S1704 after an output value is determined in S1706, so as to determine whether to execute the corrected output value determination process of S1707. Furthermore, the essential point of the present embodiment is that the correction processing taking the inter-color cumulative value for each pixel in a lower density region into account is performed. Accordingly, it is also possible to apply the present embodiment to an image forming system configured to perform correction on a predetermined region of output image data, which is obtained by performing halftoning on input image data obtained as a result of color separation, in a case where the total number of the output values in the region is equal to or smaller than a predetermined value.

Figure 19:
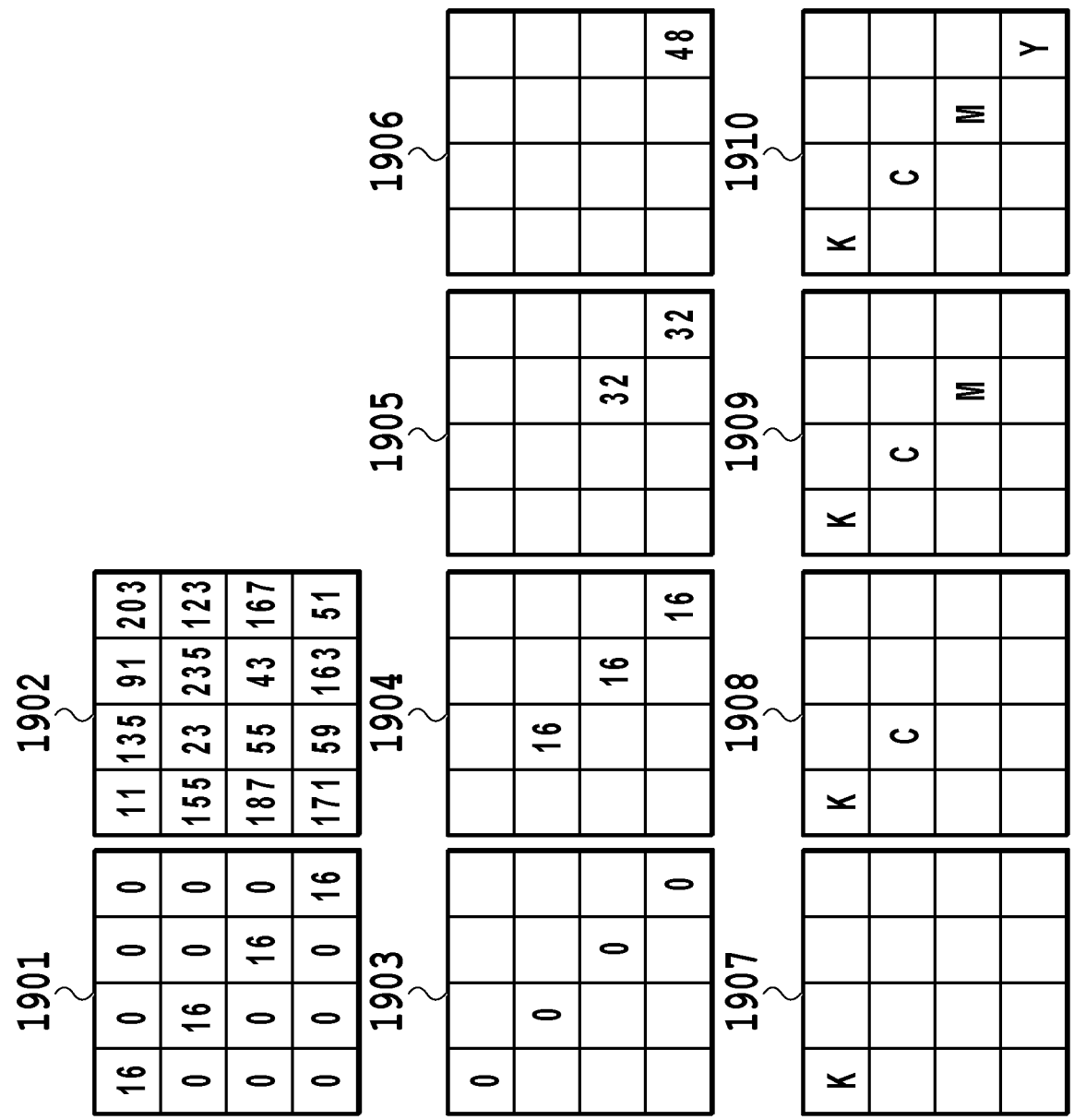
FIG. 19 is a diagram for explaining operation of the image processing unit in the fifth embodiment.

Additionally, although the inter-color cumulative values of the pixels in which a dot has already been arranged are invalidated in the example shown in FIG. 19, the present embodiment is not limited to the example. That is, it is also possible to invalidate a threshold value. In a case of invalidating a threshold value, it is possible to use the minimum threshold value in a process region as shown in the fourth embodiment. That is, the minimum threshold value of a color plane in which a dot has been arranged is invalidated. This makes it possible to suppress interference caused by the positions of threshold values.

Other Embodiments

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an embodiment of the present disclosure, in a case of performing quantization processing on image data, it is possible to inhibit disappearance of a bright fine line and generate high-quality half-tone image data.

Further, according to an embodiment of the present disclosure, in a case of performing quantization processing on color image, it is possible to reproduce the color tone of a bright fine line more appropriately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-239885 and No. 2018-239935, filed Dec. 21, 2018, respectively, which are hereby incorporated by reference wherein in their entirety.

What is claimed is:

1. An image processing apparatus for generating dot data to be used for forming an image on a printing medium, the dot data defining whether or not a dot is arranged in each pixel, the image processing apparatus comprising:
    a dot number derivation unit configured to derive a number of dots to be arranged in a predetermined region of image data that is input, based on a pixel value of each pixel included in the predetermined region, the number of dots being derived on a per predetermined region basis;
    a determination unit configured to determine an arrangement priority, which indicates a priority of a pixel in which a dot is arranged in the predetermined region, by use of an evaluation value based on the pixel value of each pixel included in the predetermined region and a threshold value group in a threshold value matrix, the threshold value group corresponding to the predetermined region;
    a correction unit configured to correct the number of dots derived by the dot number derivation unit, based on a pixel value of at least one pixel in the predetermined region, in a case where the number of dots derived by the dot number derivation unit is smaller than a criterial number of dots; and
    a generation unit configured to generate the dot data corresponding to the predetermined region, based on the number of dots corrected by the correction unit and the arrangement priority determined by the determination unit.

2. The image processing apparatus according to claim 1, wherein, in the case where the number of dots derived by the dot number derivation unit is smaller than the criterial number of dots, the correction unit is configured to correct the number of dots corresponding to the predetermined region into the criterial number of dots.

3. The image processing apparatus according to claim 1, wherein the correction unit is configured to determine whether or not to correct the number of dots derived by the dot number derivation unit, based on a pixel value of at least one pixel in the predetermined region.

4. The image processing apparatus according to claim 3, wherein, in the case where the number of dots derived by the dot number derivation unit is smaller than the criterial number of dots, the correction unit is configured to determine whether or not to correct the number of dots derived by the dot number derivation unit, based on a representative value corresponding to a pixel value of at least one pixel in the predetermined region and a minimum threshold value in the threshold value group.

5. The image processing apparatus according to claim 4, wherein the correction unit is configured to compare the representative value and the minimum threshold value in the threshold value group and, in a case where the representative value of the predetermined region is larger than the minimum threshold value in the threshold value group, the correction unit is configured to correct the number of dots derived by the dot number derivation unit such that the number of dots is increased to the criterial number of dots.

6. The image processing apparatus according to claim 4, wherein, in a case where the representative value of the predetermined region is equal to or smaller than the minimum threshold value of the threshold value group, the correction unit is configured not to correct the number of dots derived by the dot number derivation unit.

7. The image processing apparatus according to claim 4, wherein, in a case of comparing the representative value of the predetermined region and the minimum threshold value of the threshold value group, the correction unit is configured to multiply the representative value of the predetermined region by a predetermined coefficient corresponding to a number of effective pixels or a position of an effective pixel in the predetermined region, so as to compare the representative value multiplied by the predetermined coefficient and the minimum threshold value of the threshold value group.

8. The image processing apparatus according to claim 7, wherein, in a case where a number of not-white pixels (effective pixels) included in the predetermined region is equal to or smaller than a predetermined number and at least one of the not-white pixels is present at an edge of the predetermined region, the correction unit is configured to multiply the representative value of the predetermined region by the predetermined coefficient in the case of comparing the representative value of the predetermined region and the minimum threshold value of the threshold value group.

9. The image processing apparatus according to claim 4, wherein the representative value of the predetermined region is a total value, a maximum value, a minimum value, or a median value of pixel values of respective pixels included in the predetermined region, or the representative value is an average value or a median value of pixel values of pixels included in the predetermined region whose pixel value is larger than a predetermined value.

10. The image processing apparatus according to claim 1, wherein the criterial number of dots is determined based on a size of the predetermined region.

11. The image processing apparatus according to claim 10, wherein the criterial number of dots is 1 in a case where the size of the predetermined region is four pixels by four pixels.

12. The image processing apparatus according to claim 1 further comprising
    a cumulative representative value derivation unit configured to derive a cumulative representative value that is obtained by accumulating a representative value of pixel values of the predetermined region corresponding to a color material whose dot data has already been generated among color materials to be used for forming the image,
    wherein the correction unit is further configured to correct the number of dots derived by the dot number derivation unit, based on the cumulative representative value.

13. The image processing apparatus according to claim 1, wherein the determination unit is configured to derive the evaluation value of each pixel included in the predetermined region, based on the pixel value of each pixel included in the predetermined region and each threshold value of the threshold value group, and configured to determine the arrangement priority, based on the derived evaluation value.

14. The image processing apparatus according to claim 13, wherein the determination unit is configured to derive the evaluation value by subtracting the pixel value of each pixel included in the predetermined region by a corresponding threshold value in the threshold value group, and configured to determine the arrangement priority by sorting the derived evaluation value in descending order.

15. The image processing apparatus according to claim 14, wherein, for a pixel included in the predetermined region whose pixel value is equal to or smaller than a predetermined value, the determination unit is configured to derive the evaluation value by subtracting the pixel value of the pixel by a maximum value of the threshold value group corresponding to the predetermined region.

16. The image processing apparatus according to claim 12, wherein the correction unit is configured not to correct the number of dots derived by the dot number derivation unit, in a case where the cumulative representative value is equal to or smaller than the minimum threshold value.

17. The image processing apparatus according to claim 12, wherein the correction unit is configured to correct the number of dots derived by the dot number derivation unit, in a case where the number of dots defined to be arranged in the predetermined region is smaller than a number of not-white pixels (effective pixels) included in the predetermined region.

18. The image processing apparatus according to claim 17, wherein the correction unit is configured to correct the number of dots derived by the dot number derivation unit by adding a correction value to the number of dots, the correction value being obtained by subtracting a number of threshold values that are smaller than the cumulative representative value of the predetermined region by the number of dots defined to be arranged in the predetermined region, the threshold values being included in the threshold value group corresponding to the predetermined region.

19. The image processing apparatus according to claim 17, wherein the correction unit is configured to modify the evaluation value so that the arrangement priority of a pixel in which a dot of another color is defined to be arranged in the predetermined region becomes lower than that of another pixel.

20. The image processing apparatus according to claim 12, wherein, in a case where a dot of another color is defined to be arranged in the predetermined region, the correction unit is configured not to correct the number of dots derived by the dot number derivation unit.

21. An image processing method for generating dot data to be used for forming an image on a printing medium, the dot data defining whether or not a dot is arranged in each pixel, the method comprising the steps of:
  deriving a number of dots to be arranged in a predetermined region of image data that is input, based on a pixel value of each pixel included in the predetermined region, the number of dots being derived on a per predetermined region basis;
  determining an arrangement priority, which indicates a priority of a pixel in which a dot is arranged in the predetermined region, by use of an evaluation value based on the pixel value of each pixel included in the predetermined region and a threshold value group in a threshold value matrix, the threshold value group corresponding to the predetermined region;
  correcting the derived number of dots, based on a pixel value of at least one pixel in the predetermined region, in a case where the derived number of dots is smaller than a criterial number of dots; and
  generating the dot data corresponding to the predetermined region, based on the corrected number of dots and the determined arrangement priority.

22. A non-transitory computer readable storage medium storing a program for causing a computer to perform an image processing method for generating dot data to be used for forming an image on a printing medium, the dot data defining whether or not a dot is arranged in each pixel, the method comprising the steps of:
  deriving a number of dots to be arranged in a predetermined region of image data that is input, based on a pixel value of each pixel included in the predetermined region, the number of dots being derived on a per predetermined region basis;
  determining an arrangement priority, which indicates a priority of a pixel in which a dot is arranged in the predetermined region, by use of an evaluation value based on the pixel value of each pixel included in the predetermined region and a threshold value group in a threshold value matrix, the threshold value group corresponding to the predetermined region;
  correcting the derived number of dots, based on a pixel value of at least one pixel in the predetermined region, in a case where the derived number of dots is smaller than a criterial number of dots; and
  generating the dot data corresponding to the predetermined region, based on the corrected number of dots and the determined arrangement priority.

* * * * *